(12) United States Patent
Hall

(10) Patent No.: US 10,851,871 B2
(45) Date of Patent: Dec. 1, 2020

(54) ROPE SWINGING DEVICE

(71) Applicant: William B. Hall, Evanston, IL (US)

(72) Inventor: William B. Hall, Evanston, IL (US)

( * ) Notice: Subject to any disclaimer, the term of this patent is extended or adjusted under 35 U.S.C. 154(b) by 62 days.

(21) Appl. No.: 16/172,738

(22) Filed: Oct. 27, 2018

(65) Prior Publication Data

US 2020/0132162 A1    Apr. 30, 2020

(51) Int. Cl.
*F16G 11/02* (2006.01)
*A63B 21/00* (2006.01)
*A63B 23/12* (2006.01)
*A63B 21/018* (2006.01)
*A63B 23/035* (2006.01)

(52) U.S. Cl.
CPC .......... *F16G 11/025* (2013.01); *A63B 21/018* (2013.01); *A63B 21/4035* (2015.10); *A63B 23/03541* (2013.01); *A63B 23/12* (2013.01); *A63B 2208/0204* (2013.01)

(58) Field of Classification Search
CPC .............. A63B 21/018; A63B 21/4035; A63B 23/03541; A63B 23/12; A63B 2208/0204; F16G 11/025
See application file for complete search history.

(56) References Cited

U.S. PATENT DOCUMENTS

| | | | | |
|---|---|---|---|---|
| 3,504,763 A * | 4/1970 | Rabelos | .................... | A62B 1/14 182/7 |
| 3,765,507 A * | 10/1973 | Rabelos | .................... | A62B 1/14 182/5 |
| 3,834,489 A * | 9/1974 | Rabelos | .................... | A62B 1/14 182/5 |
| 4,253,218 A * | 3/1981 | Gibbs | ...................... | A62B 1/14 182/5 |
| 4,448,281 A * | 5/1984 | Adams | ..................... | A62B 1/14 182/193 |
| 4,603,755 A * | 8/1986 | Meschke | .................. | A62B 1/14 182/193 |
| 4,778,030 A * | 10/1988 | Blair | ........................ | A62B 1/14 182/5 |
| 4,881,302 A * | 11/1989 | Lee | ........................ | F16G 11/101 24/136 R |
| 5,090,691 A * | 2/1992 | Pollock | ................ | A63B 21/151 16/426 |
| 7,008,330 B1 * | 3/2006 | Moulder | ................. | A63G 9/00 472/118 |
| 2015/0024908 A1 * | 1/2015 | Hall | ................... | A63B 21/4035 482/93 |
| 2016/0016042 A1 * | 1/2016 | Maurice | ................ | A63B 29/02 188/65.2 |
| 2019/0329098 A1 * | 10/2019 | Anderson | ............ | F16D 63/008 |

* cited by examiner

*Primary Examiner* — Joshua Lee
(74) *Attorney, Agent, or Firm* — Andover Patents, LLC; Daniel N. Beinart

(57) ABSTRACT

A rope swinging device includes a strap attached to an optional handgrip, and a clamp attached to the strap. The clamp may be attached to a rope that is swung by a user.

20 Claims, 40 Drawing Sheets

ROPE SWINGING DEVICE

TECHNICAL FIELD

The subject matter described herein relates generally to the field of athletic training equipment, and more particularly to a rope swinging device that provides an improved means for holding and swinging a rope during physical exercise.

BACKGROUND

Existing rope swinging devices for an athlete or other person with physical fitness goals, such as battle ropes, require a grip of the rope swinging device by the athlete that can result in the athlete developing wrist complications in the form of stiffness, clicking noises, loss of range in motion, pain, and various impingements of the wrist and forearms such as carpel tunnel when performing various other tasks. It can also be uncomfortable for an athlete to grip existing rope swinging devices, as use of existing devices can present undesirable forces on the wrists. Users with smaller hands may have difficulty directly gripping a rope comfortably and securely due to the rope's thick girth. Furthermore, existing rope swinging devices can limit exercise, drill speeds, control of the rope, and the ability of the user to focus on an intended exercise, due to the lack of a secure gripping mechanism. Existing rope swinging devices prevent a user from gripping a rope at an advantageous angle which would make exercises smoother from a biomechanics standpoint.

Furthermore, existing rope swinging devices have gripping solutions that are integral to the battle rope component, thereby making it impossible to use different gripping mechanisms or to use a particular gripping mechanism with more than one battle rope.

Furthermore, without the use of a rope swinging device, grip options with battle ropes are limited (overhand or underhand), and such grips are not aligned with the flexion and extension functions of the wrist joints.

Therefore, a need exists for a rope swinging device that provides a more comfortable and secure grip, reduces the presence of undesirable forces on the wrists, and better facilitate proper biomechanics by providing an axis of rotation that allows for proper flexion and extension at the wrist which is healthier and safer for the wrist joint. Furthermore, a need exists for a rope swinging device that provides a user with ability to attach to a variety of battle ropes.

A device constructed as described herein addresses these deficiencies.

SUMMARY

A rope swinging device is provided that can include a strap substantially consisting of a flexible material, wherein the strap is a continuous loop, an optional handgrip that may be attached to the strap, a clamp attached to the strap for attaching to a rope. The clamp can include a substantially circular clamping component, and a movable clamping component, where a space between the substantially circular clamping component and the movable clamping component may vary, and a tightening handle, wherein the tightening handle may be operated to decrease the space to attach the clamp to a rope.

In some implementations, the following features can be present in any suitable combination.

The substantially circular clamping component may have a substantially flat side, which may be disposed substantially opposite the tightening handle.

The optional handgrip may be substantially cylindrical and hollow and the strap may be routed through the optional handgrip.

The strap may be substantially flat.

The clamp may also have two gaps, where the strap is routed through the gaps. The gaps may be disposed substantially opposite each other on the clamp.

The strap may include two components for preventing the strap from being pulled completely through said gaps.

DETAILED DESCRIPTION

Figure 1:
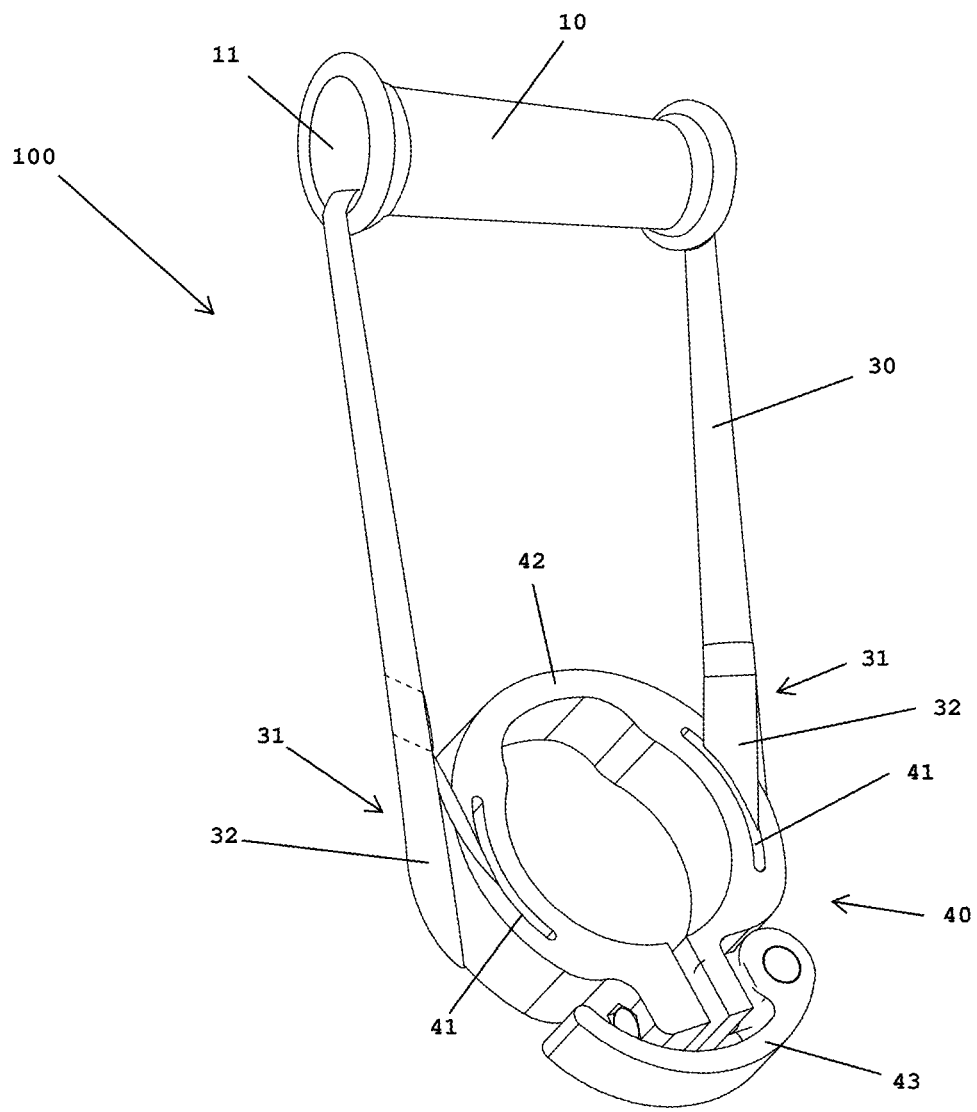
FIG. 1 depicts a view of a first embodiment of a rope swinging device.
Figure 2:
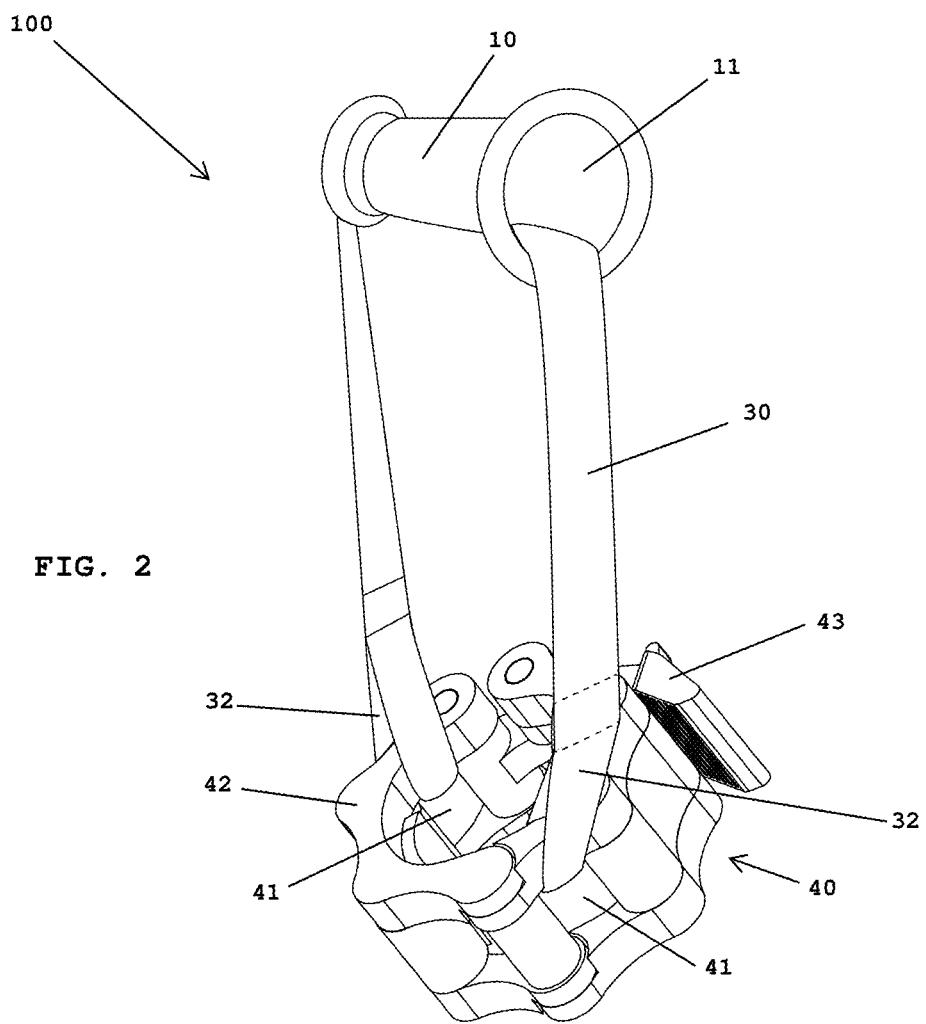
FIG. 2 depicts a view of a second embodiment of a rope swinging device.

A first embodiment of a rope swinging device 100, as depicted in FIG. 1, comprises a handgrip 10, a first strap 30, and a clamp 40. Handgrip 10 is used by a person using a rope swinging device 100 to hold the rope swinging device 100 when a rope is attached to the rope swinging device 100 by attaching clamp 40 to an end of the rope. Some embodiments (not shown) of a rope swinging device 100 also comprise a grip cushion.

Figure 3:
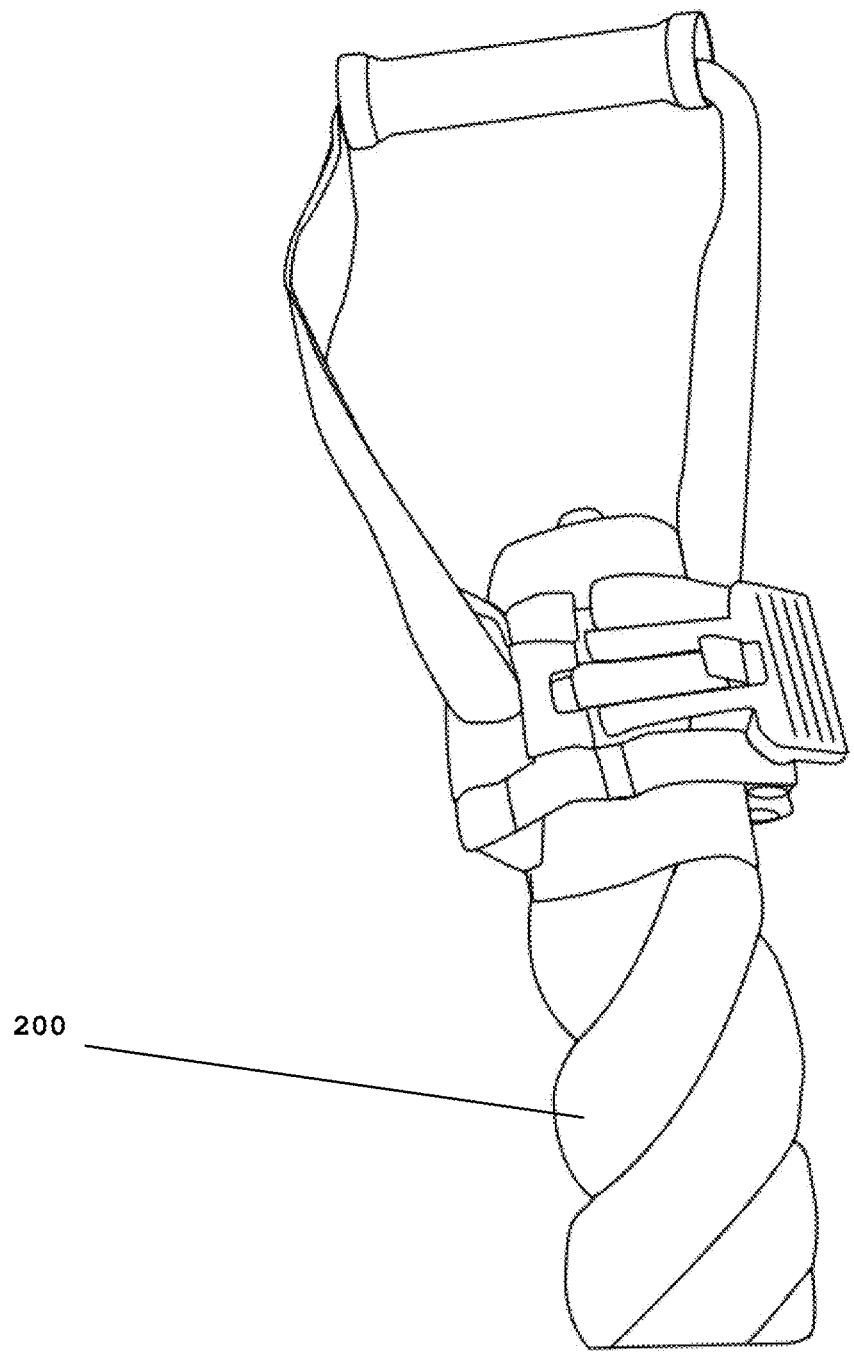
FIG. 3 depicts a view of the second embodiment of a rope swinging device attached to a rope.
Figure 4:
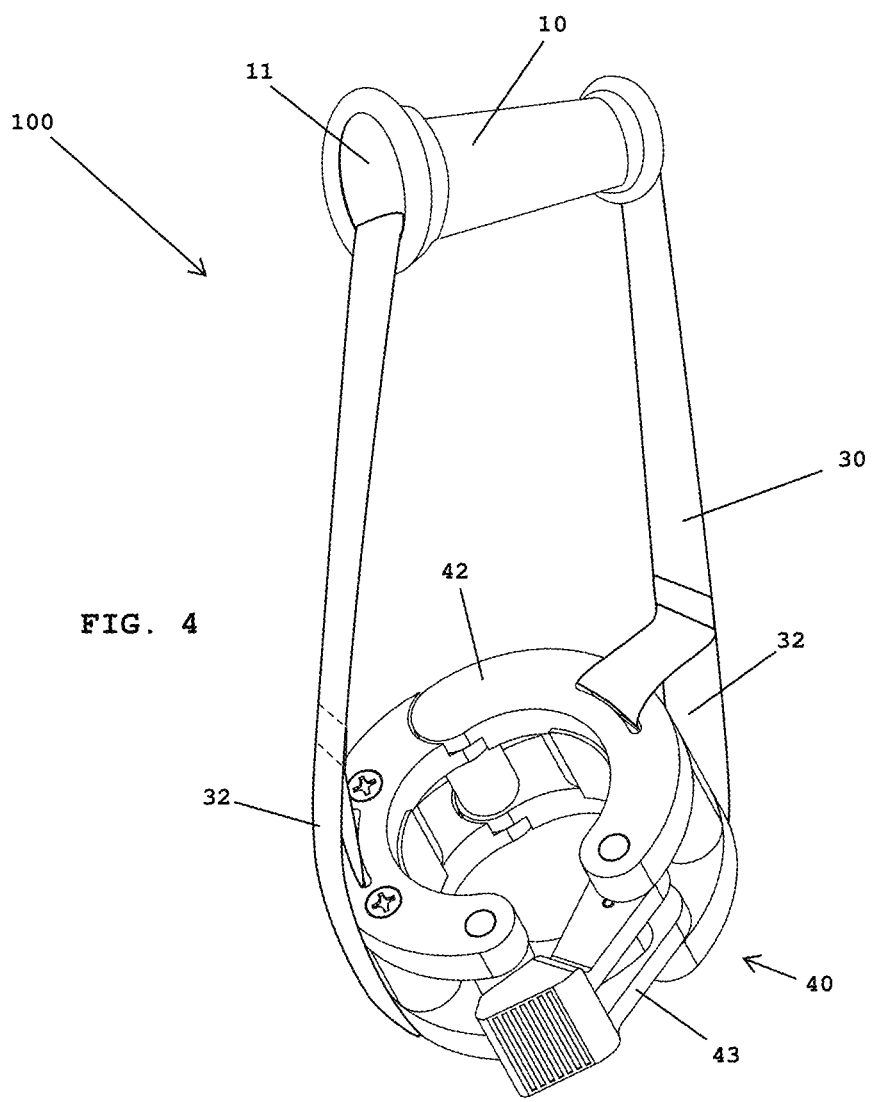
FIG. 4 depicts a view of a third embodiment of a rope swinging device.
Figure 5:
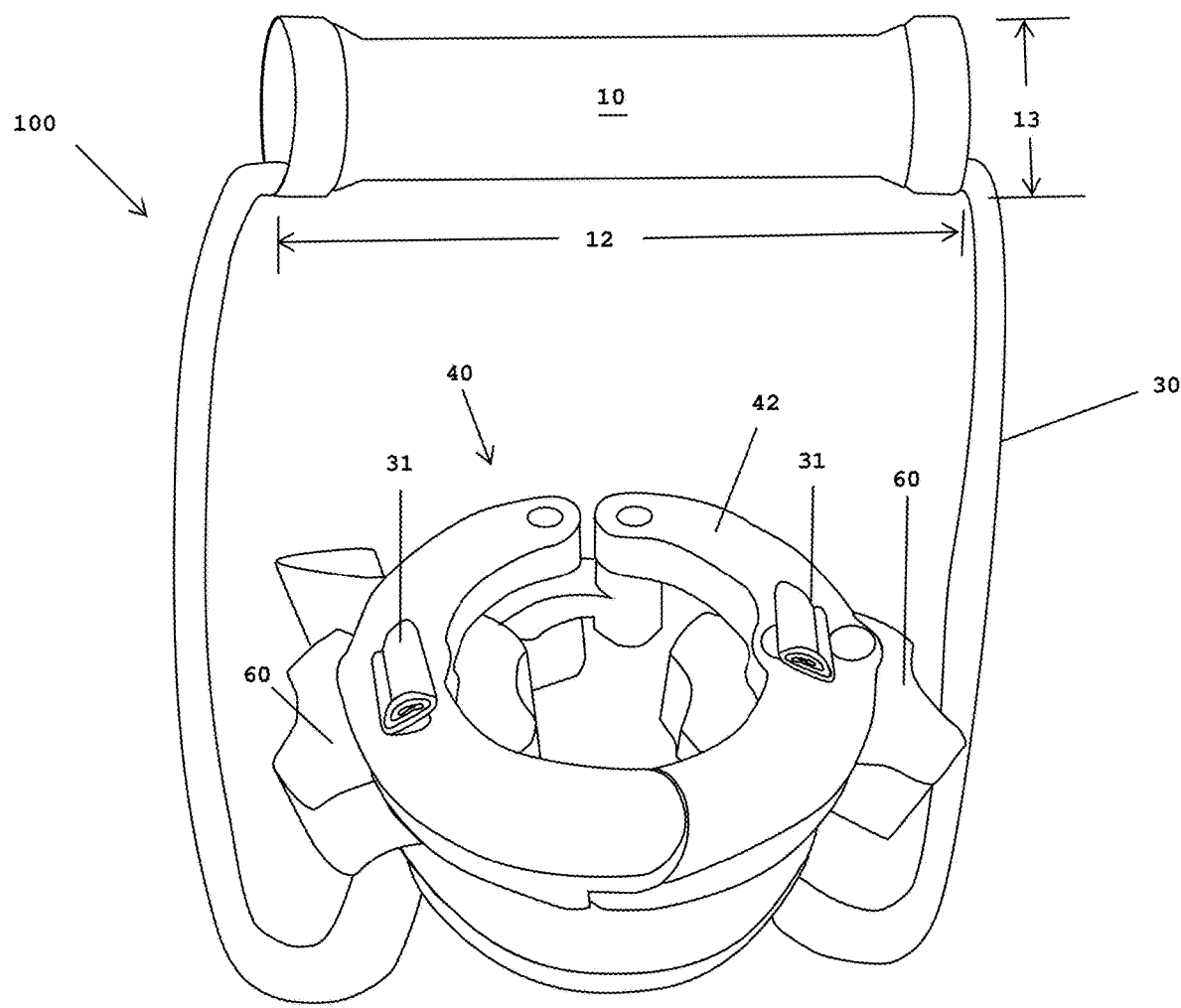
FIG. 5 depicts a view of a fourth embodiment of a rope swinging device.

In first, second, and third embodiments of a rope swinging device 100 that are described and depicted herein (FIGS. 1-4), clamp 40 comprises two gaps 41, and first strap 30 has two ends 31 that comprise two end loops 32 that attach first strap 30 to clamp 40 by being routed through the two gaps 41. Clamp 40 has a substantially circular clamping component 42, and in some embodiments, the two gaps 41 are disposed substantially opposite each other on circular clamping component 42, i.e., 180 degrees apart. In the depicted embodiments, clamp 40 further comprises a clamp tightening mechanism 43, which may be used to tighten circular clamping component 42 around an end of a rope as depicted in FIG. 3. In some embodiments, circular clamping component 42 decreases in circumference when clamp tightening mechanism 43 is operated to tighten circular clamping component 42 around an end of a rope.

Figure 6:
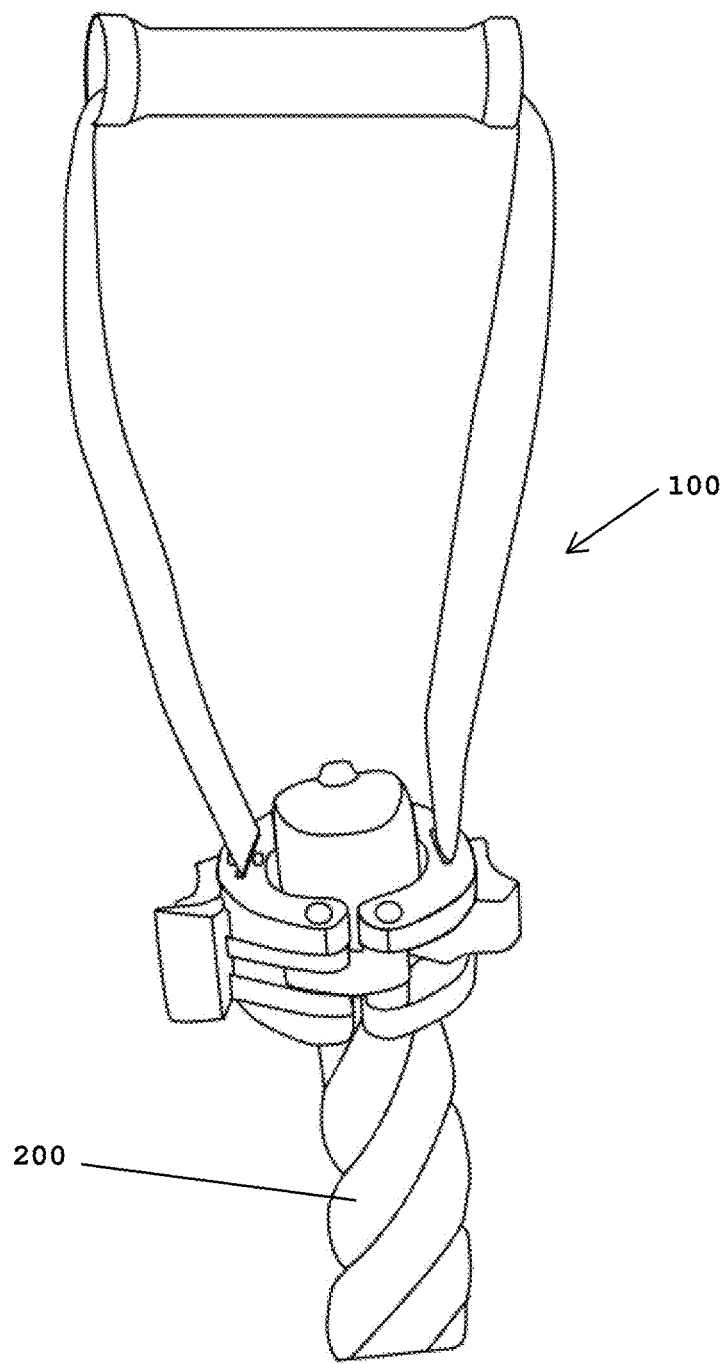
FIG. 6 depicts a view of the fourth embodiment of a rope swinging device attached to a rope.
Figure 7:
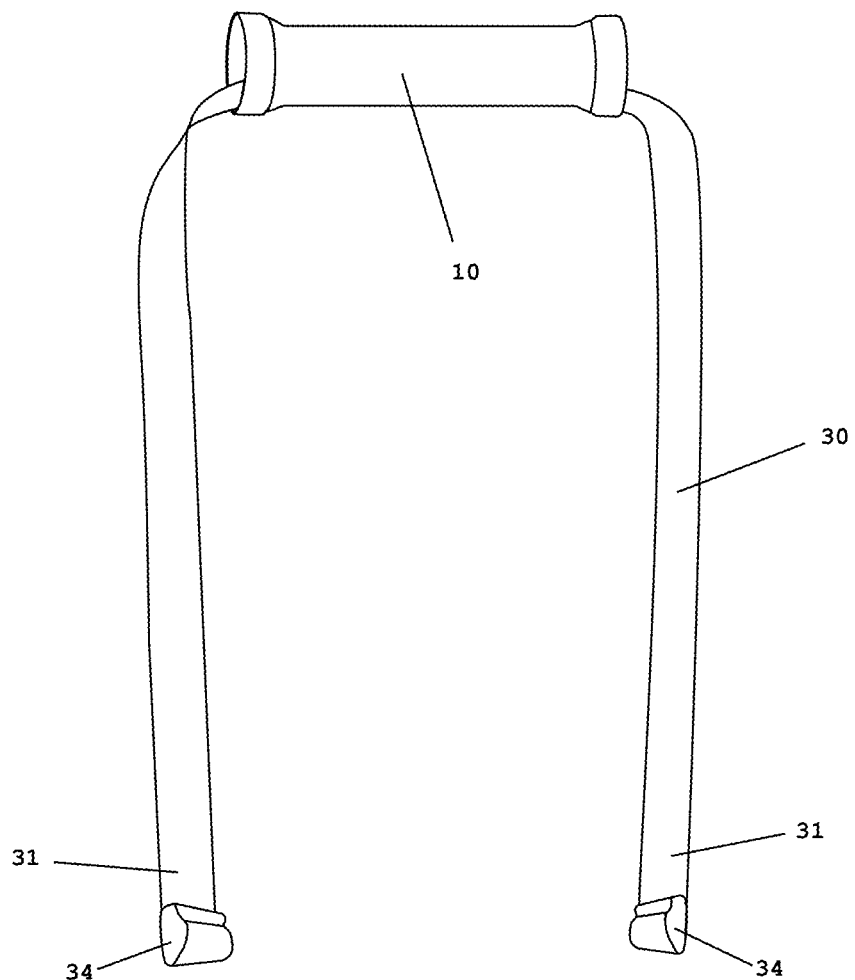
FIGS. 7, 8, 9A, 9B, 9C, 9D, and 10 depict views of components of the fourth embodiment of a rope swinging device.
Figure 8:
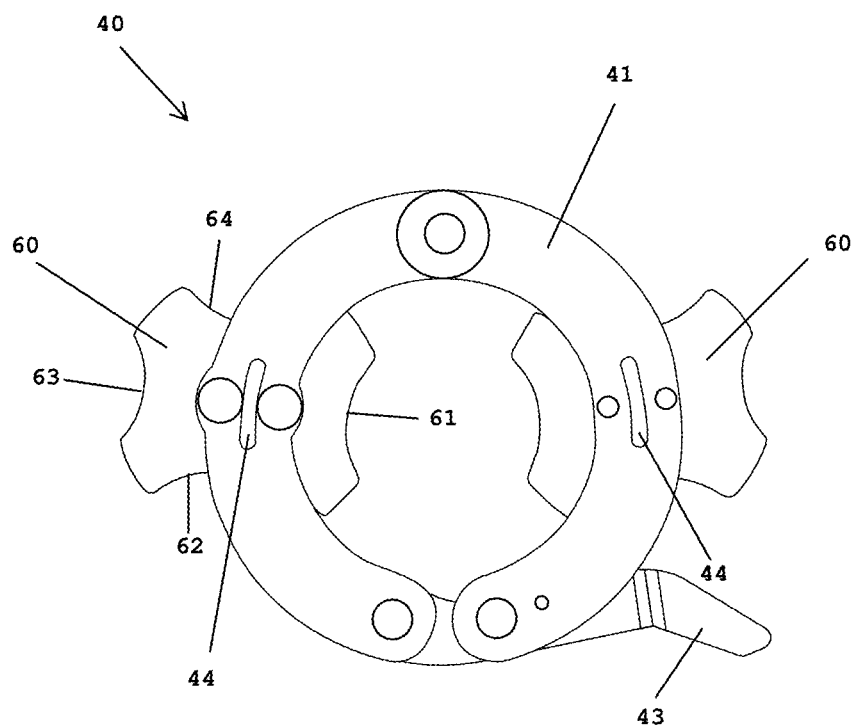
Figure 9A:
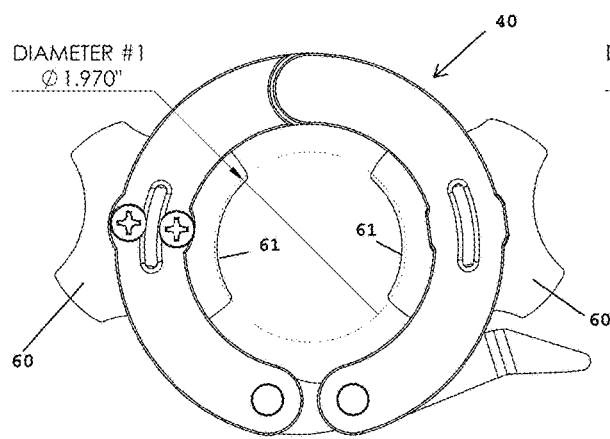
Figure 9B:
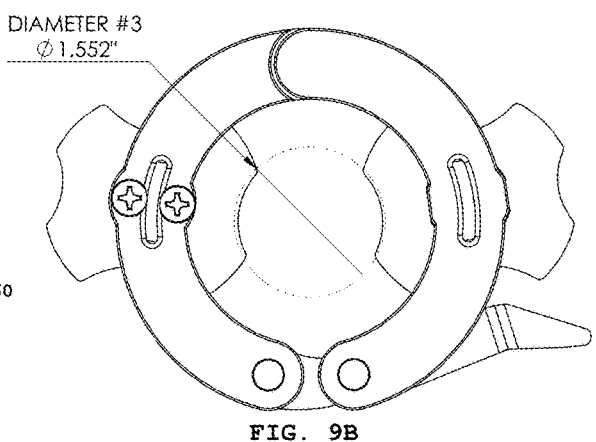
Figure 9C:
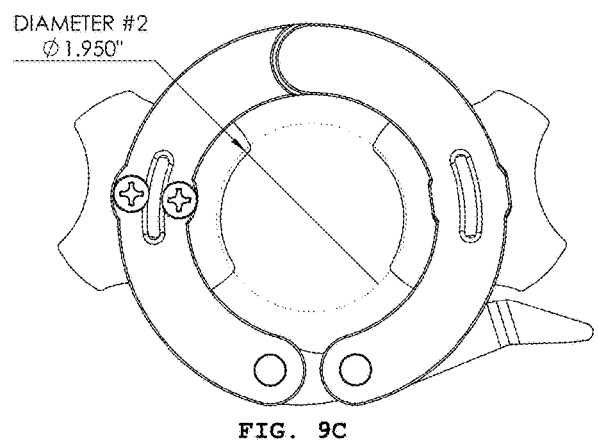
Figure 9D:
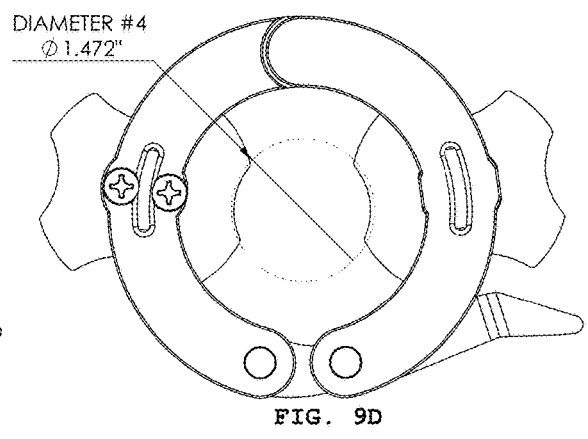
Figure 10:
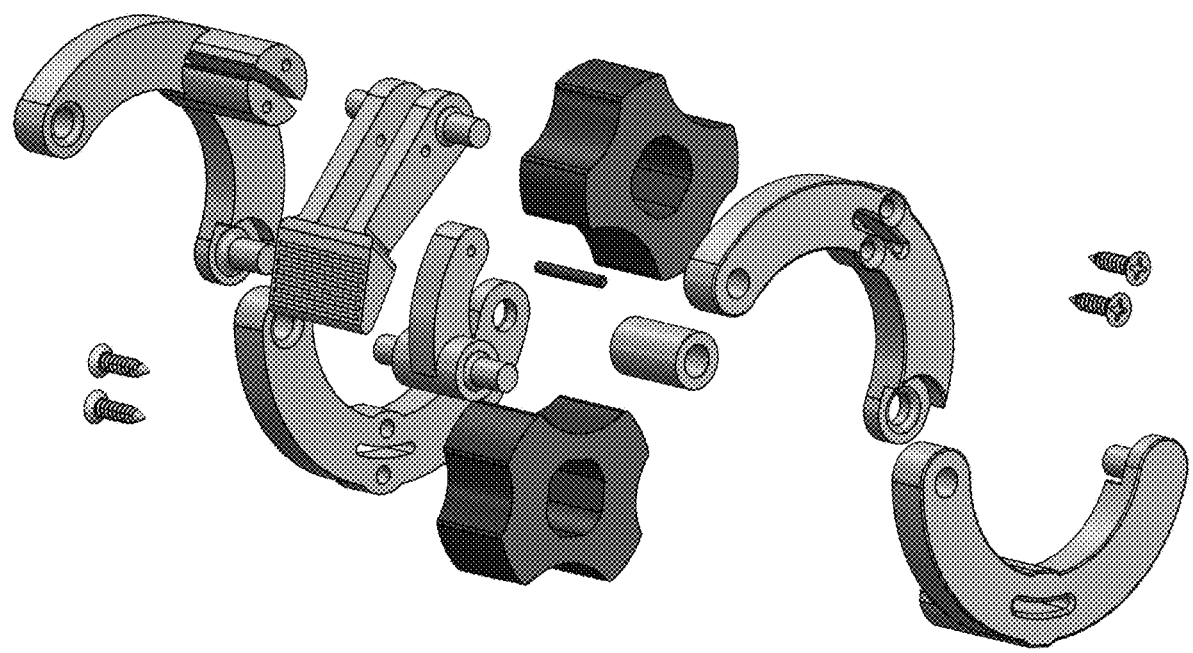
Figure 11:
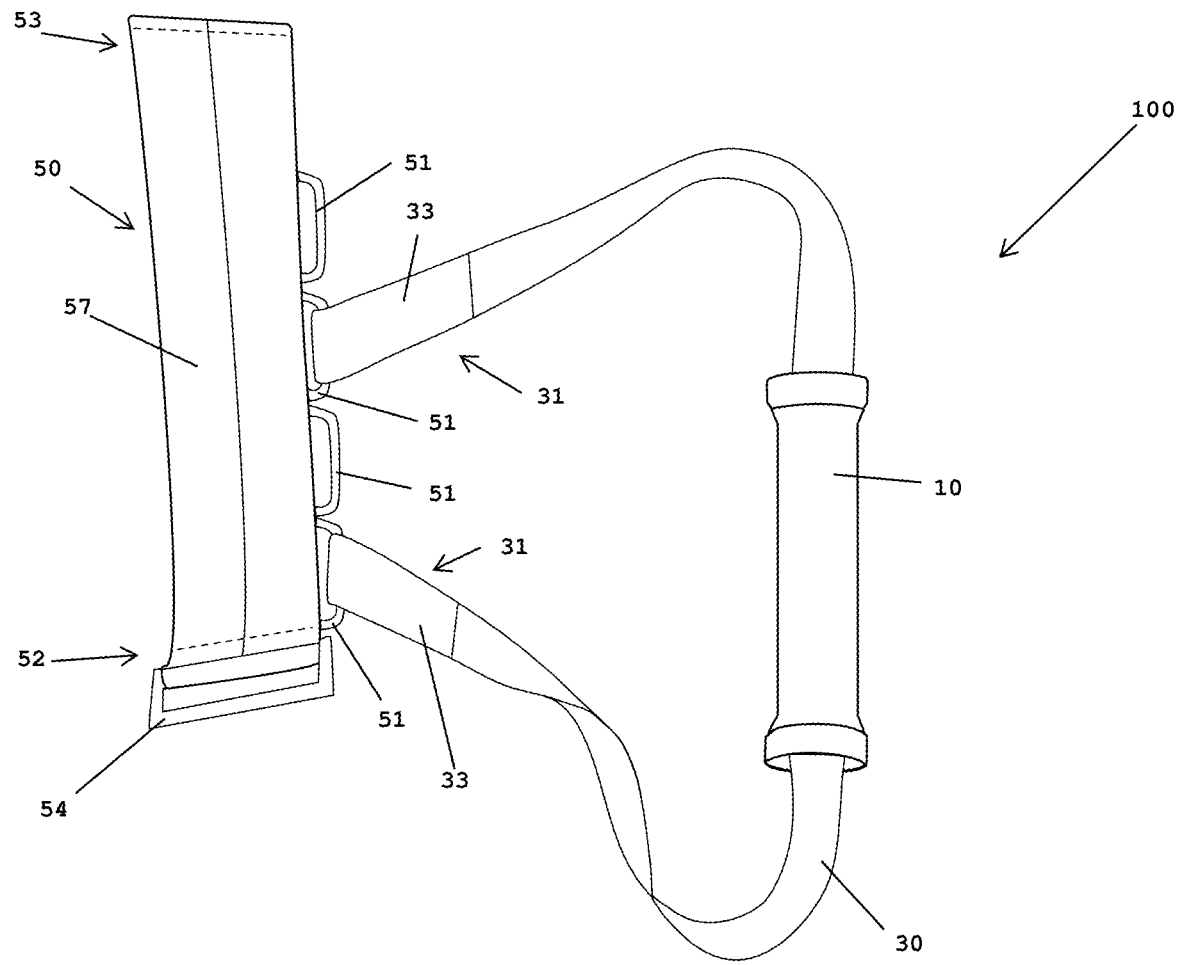
FIGS. 11 and 12 depict views of a fifth embodiment of a rope swinging device.
Figure 12:
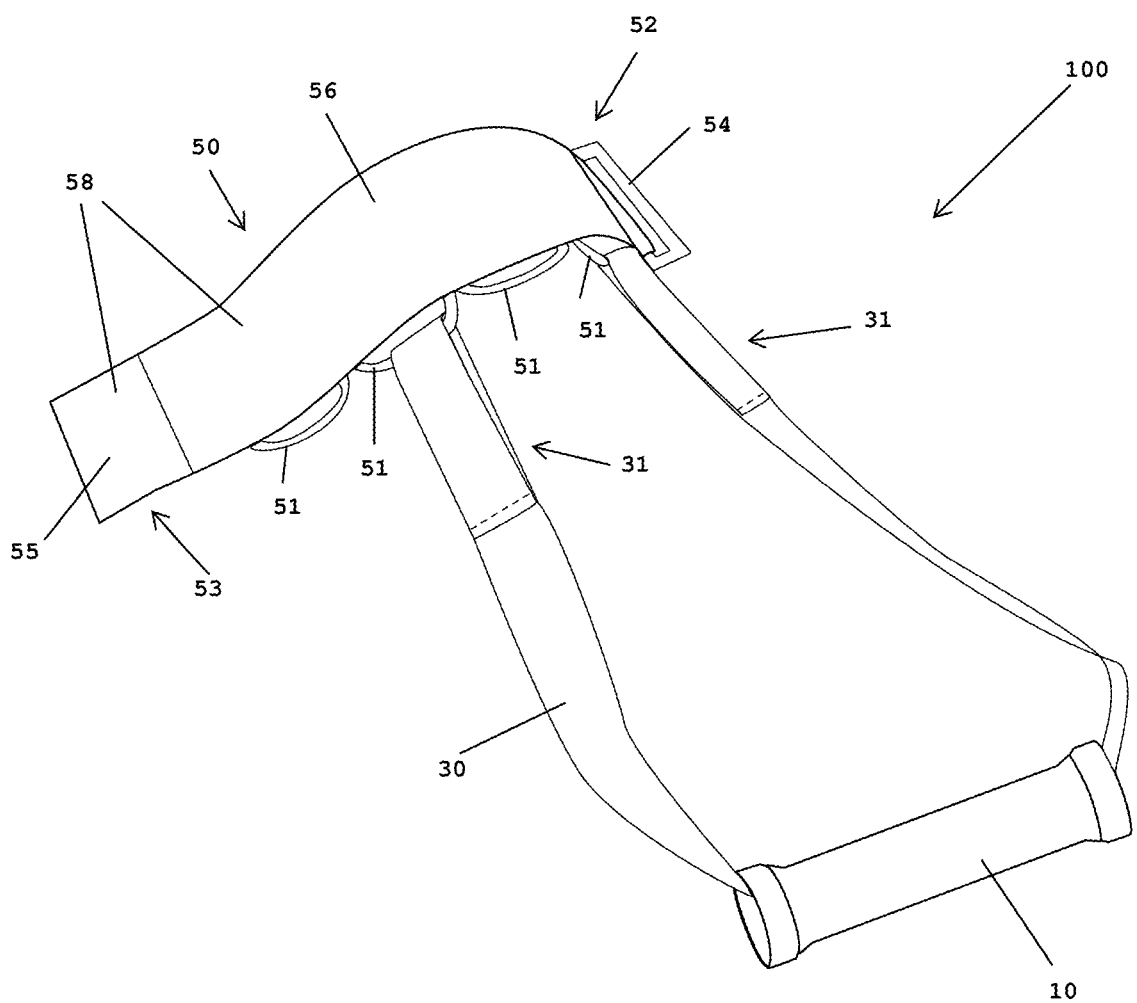
Figure 13:
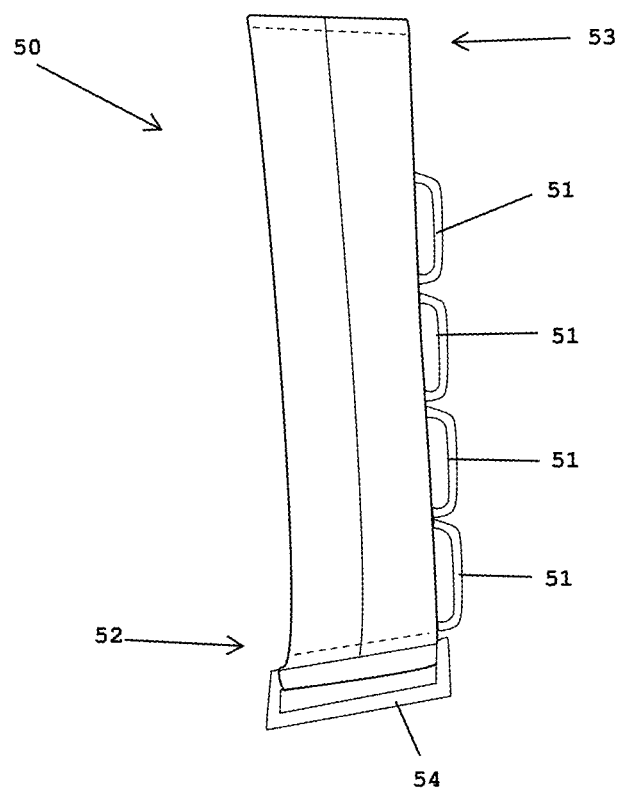
FIGS. 13 and 14 depict views of components of the fifth embodiment of a rope swinging device.
Figure 14:
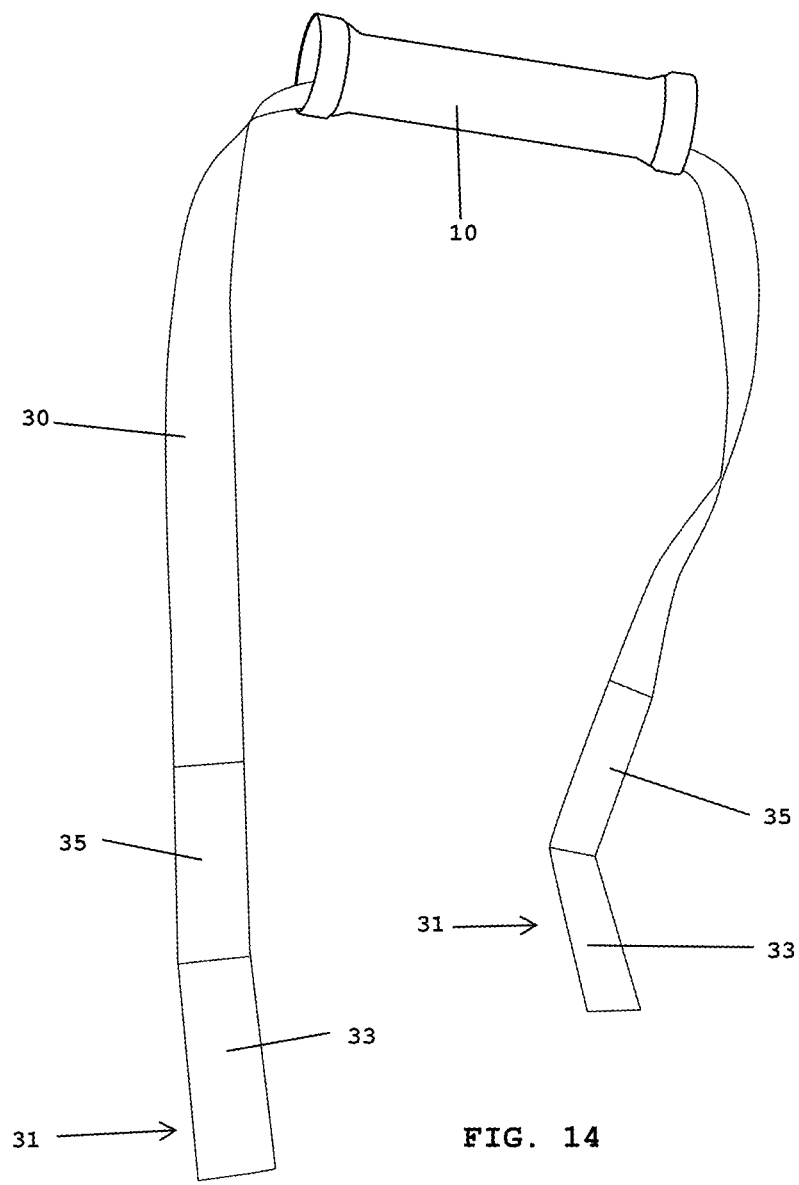

In a fourth embodiment of a rope swinging device 100 that is described and depicted herein (FIGS. 5, 6, 7, 8, 9A, 9B, 9C, 9D, and 10), clamp 40 comprises two securing components 60 for securing the clamp 40 to a rope. Each of the two securing components 60 may be comprised of rubber or other similar material and is disposed substantially opposite the other on the circumference of the clamp 40 and is rotatable about an axis of rotation. Each securing component 60 has four convex sides (FIG. 8: 61, 62, 63, and 64), one of which contacts the rope when clamp 40 is tightened around it. The sides are of differing radii from the axis of rotation, thus each securing component 60 has an asymmetry about its axis of rotation. This asymmetry of each securing component 60 allows for multiple configurations of the two securing components 60, thus permitting the rope swinging device 100 to attach to ropes of different diameters. FIG. 6 depicts a rope swinging device 100 attached to a rope 200.

FIGS. 9A, 9B, 9C, and 9D depict four different configurations of the pair of securing components 60, each providing attachment to a different diameter rope. In each of the four figures, each of the pair of securing components 60 has been rotated such that side 61, 62, 63, or 64, respectively, of each is disposed inward, capable of contacting a rope of a different respective diameter when clamp 40 is tightened around it. In the depicted embodiment, diameters of 1.472, 1.552, 1.950, and 1.970 are shown.

In other embodiments (not shown), the securing components 60 are not rotatable. In still yet other embodiments (not shown), a clamp 40 has less than or more than two securing components, and/or a securing component has less than or more than two sides, and/or some or all of the sides may not be convex.

Each end 31 of the first strap 30 is routed through an opening 44 in the clamp 40, rolled up and sewn to create a knob 34 (FIG. 7) that is larger than opening 44 so that the end 31 cannot be removed from the opening, in order to attach first strap 30 to the clamp 40.

In a fifth embodiment of a rope swinging device 100 that is described and depicted herein (FIGS. 11-15), clamp 40 comprises a second strap 50 which further comprises two or more attachment components 51 for attaching the second strap 50 to the two ends 31 of a first strap 30. Each of the ends 31 of first strap 30 have an attaching mechanism. In the embodiments described and depicted herein, the attaching mechanisms comprise two mating sections of a hook and loop fastener 33 (hook) and 35 (loop). Each first strap end 31 may be routed through one of the attachment components 51, thus enabling the first strap 30 to be attached to the second strap 50 by using the sections of hook and loop fastener 33, 35 to selectively secure each end of first strap 30 to the second strap 50. Selection of the pair of attaching components may be based on the diameter of the rope to which the rope swinging device 100 is to be attached, thus enabling the rope swinging device 100 to be used with ropes of different diameters. Attaching components 51 may be comprised of polypropylene webbing.

Figure 15:
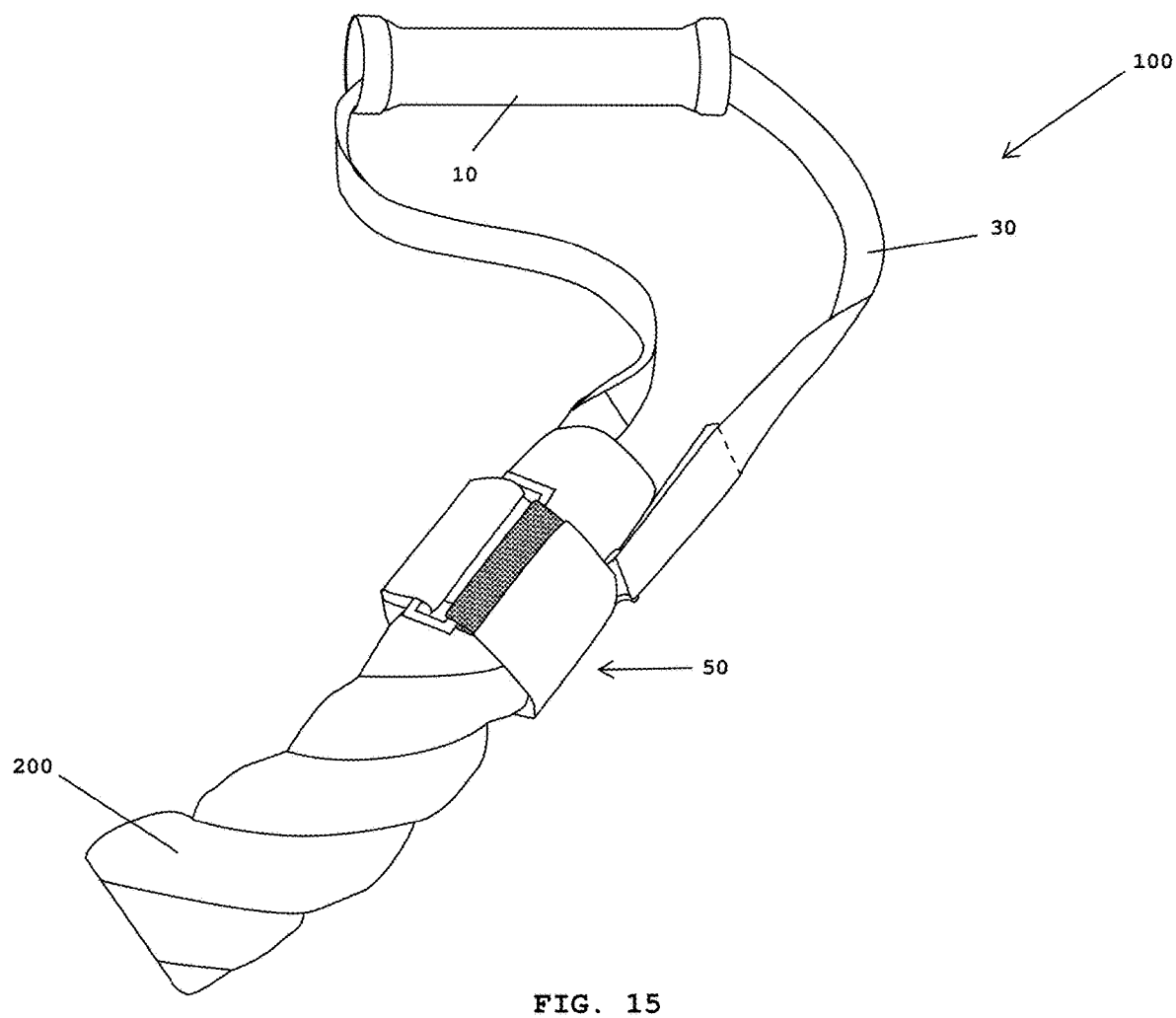
FIG. 15 depicts a view of the fifth embodiment of a rope swinging device attached to a rope.

Second strap 50 further comprises a first end 52 and a second end 53 which may be joined in order to tighten second strap 50 around a rope, and one or more joining components, which are configured for joining the two ends 52, 53 of the second strap 50 for tightening the second strap 50 around a rope as depicted in FIG. 15. The joining components comprise a ring 54 disposed on the first end 52 and two mating sections of a hook and loop fastener 55 (hook) and 56 (loop), respectively disposed on a first side 58 of the second strap 50. The second end 53 may be routed through the ring 54, and pulled to tighten the second strap 50 around a rope 200 as depicted in FIG. 15, and then the mating sections of hook and loop fastener 55 and 56 may be pressed together to selectively secure the second end 53. The ring 54 may be comprised of metal, e.g., steel, or other suitable material.

To obtain an improved grip on a rope, a second side 57 of the second strap 50 may comprise a rubberized material.

Figure 18A:
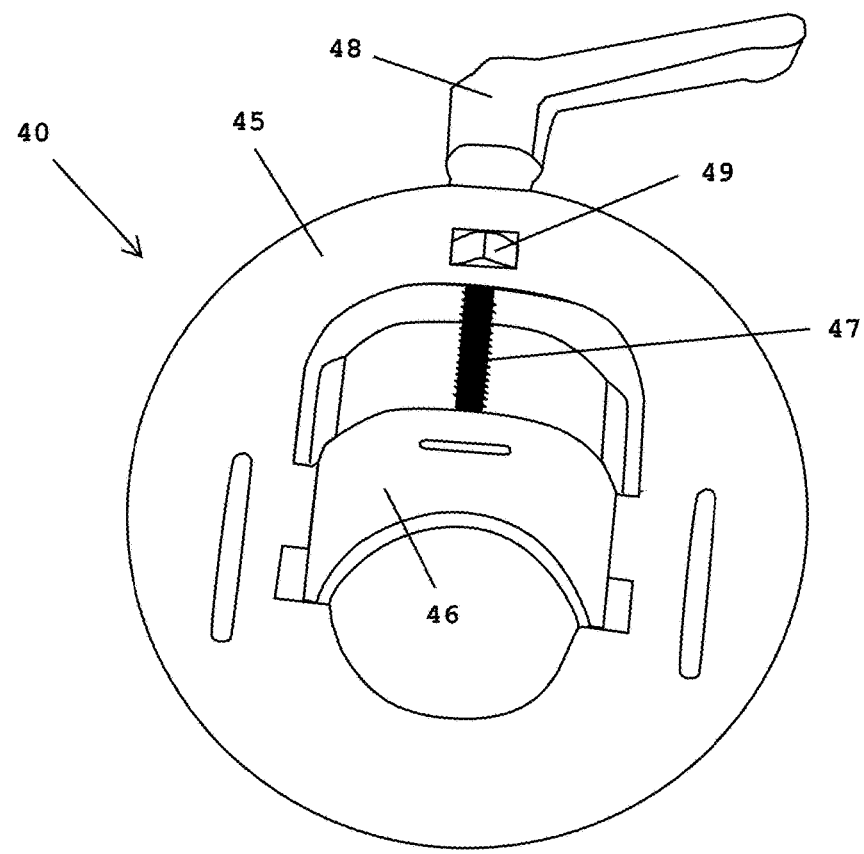
Figure 18B:
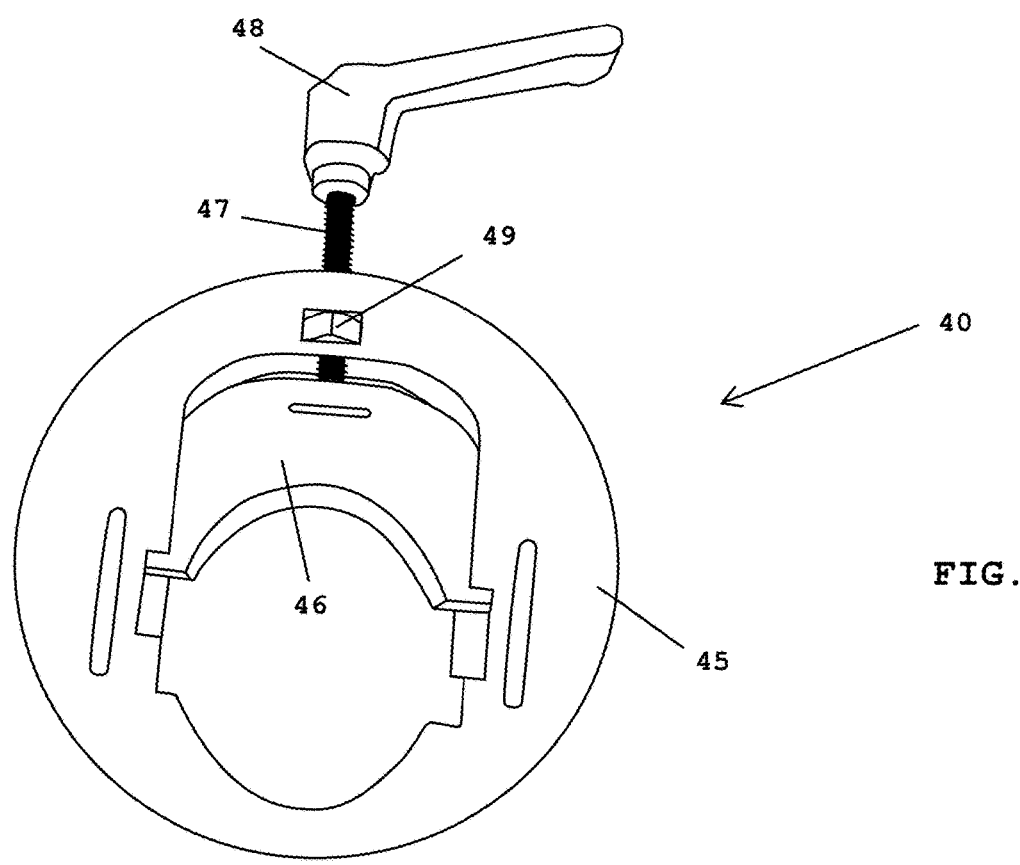
Figure 19:
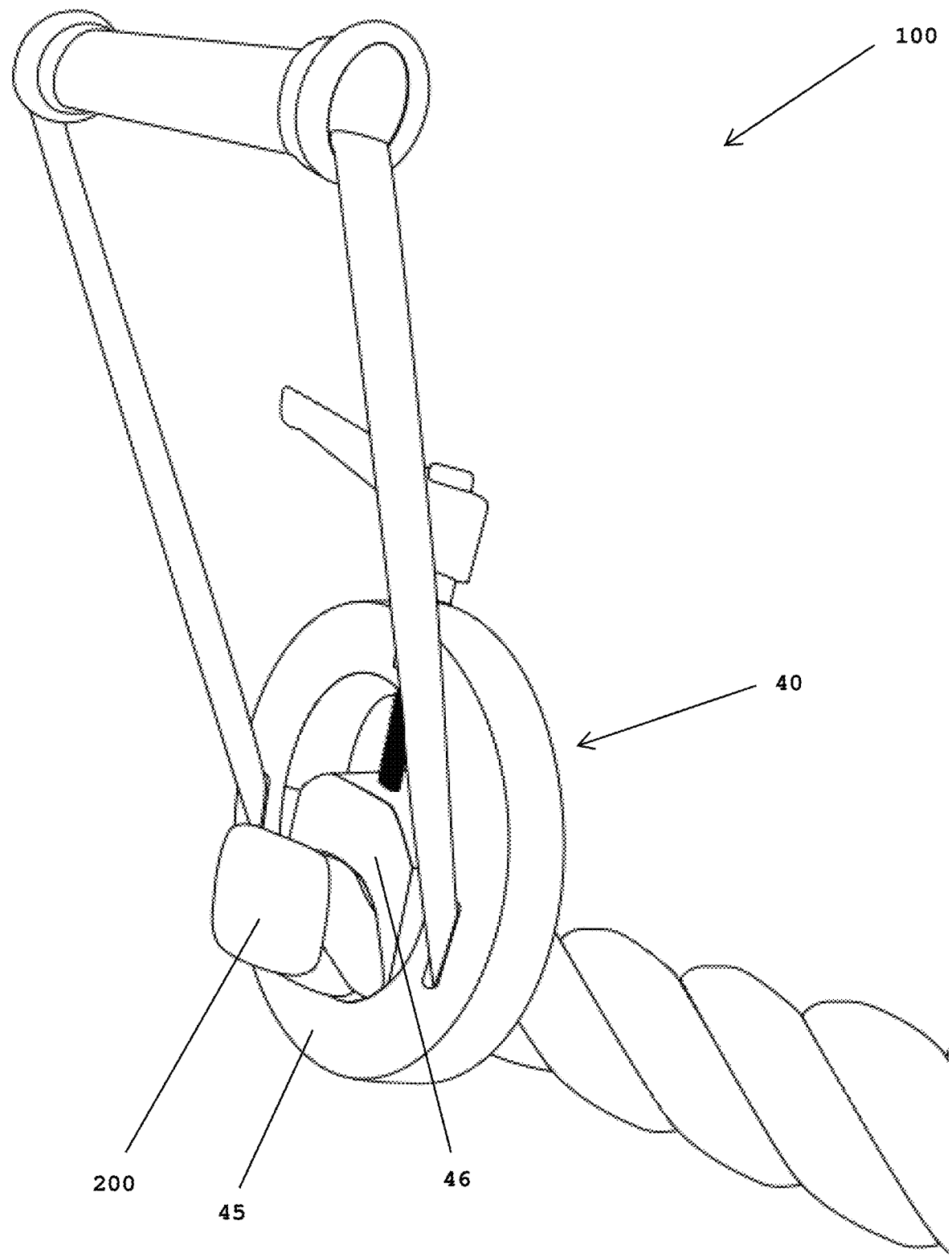
FIG. 19 depicts a view of the sixth embodiment of a rope swinging device attached to a rope.

In a sixth embodiment of a rope swinging device 100 that is described and depicted herein (FIGS. 16, 17, 18A, 18B, 19, 20A, and 20B), clamp 40 comprises a substantially circular clamping component 45, a movable clamping component 46, a tightening screw 47, a tightening handle 48 attached to tightening screw 47, and two gaps 41 that are disposed substantially opposite each other on circular clamping component 45, i.e., 180 degrees apart. Tightening screw 47 is screwed through a captive nut 49 with mating threads in circular clamping component 45 and attached to movable clamping component 46 via mating threads in movable clamping component 46. First strap ends 31 attach first strap 30 to clamp 40 by being routed through the two gaps 41. As depicted in FIG. 19, an end of a rope 200 is inserted between circular clamping component 45 and movable clamping component 46, and a tightening handle 48 is used to turn tightening screw 47, thus tightening clamp 40 around the end of the rope. This is shown in FIGS. 18A and 18B, which depict movable clamping component 46 in two different positions relative to circular clamping component 45.

Figure 16:
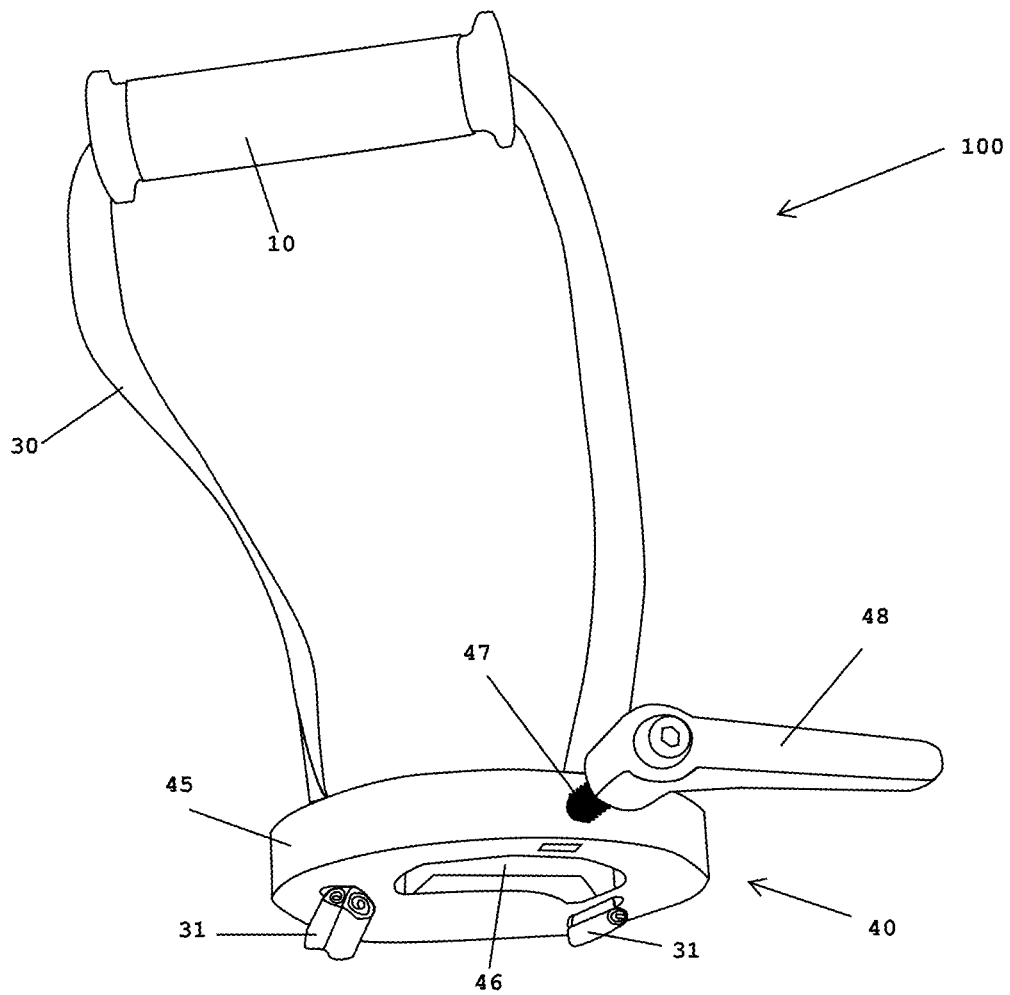
FIG. 16 depicts a view of a sixth embodiment of a rope swinging device.
Figure 17:
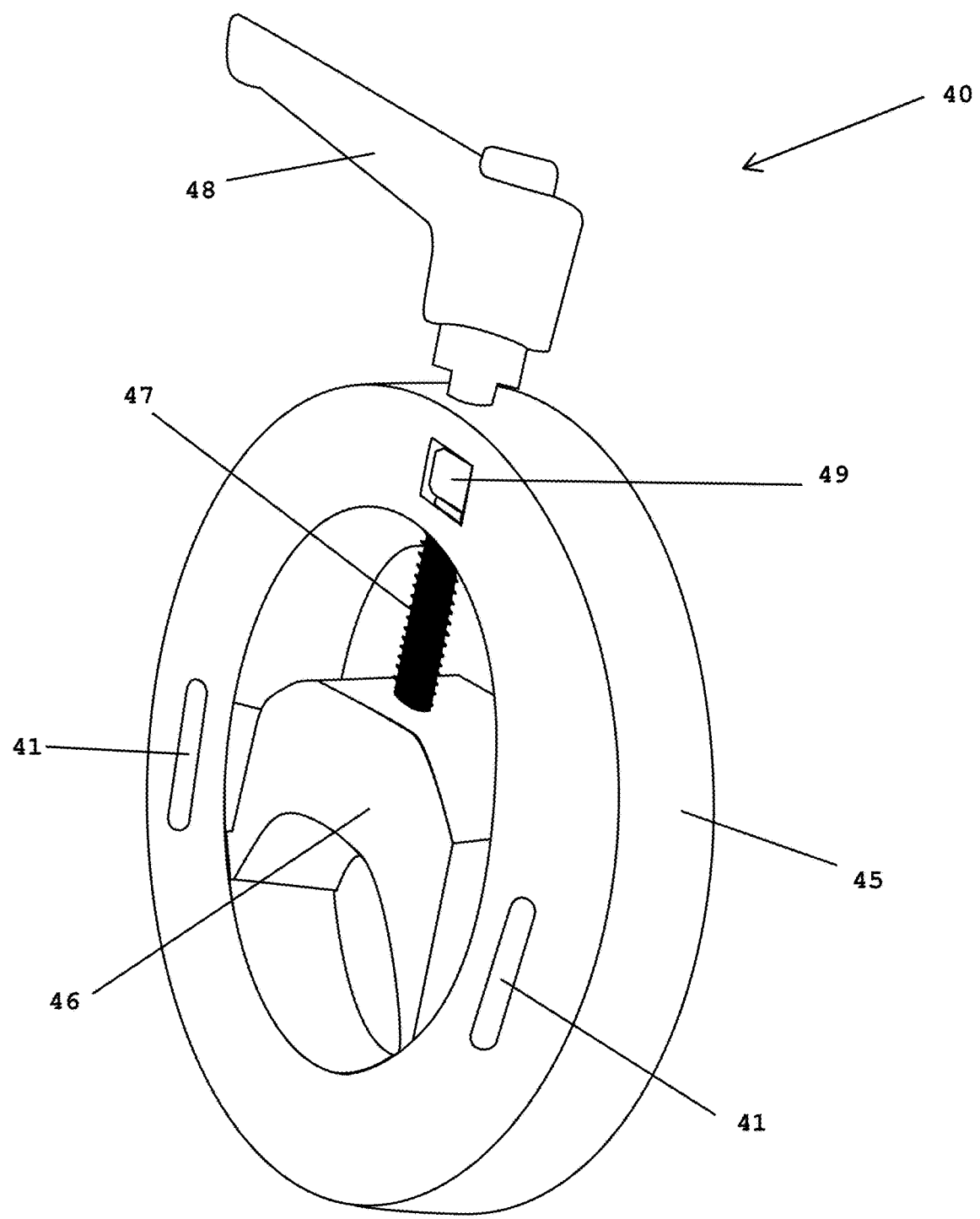
FIGS. 17, 18A, and 18B depict views of components of the sixth embodiment of a rope swinging device.

Although depicted in FIGS. 16 and 19, it should be noted that handgrip 10 is optional, as strap 30 may be gripped directly by a user's hand and/or wrapped around a user's hand and/or wrist.

Figure 24A:
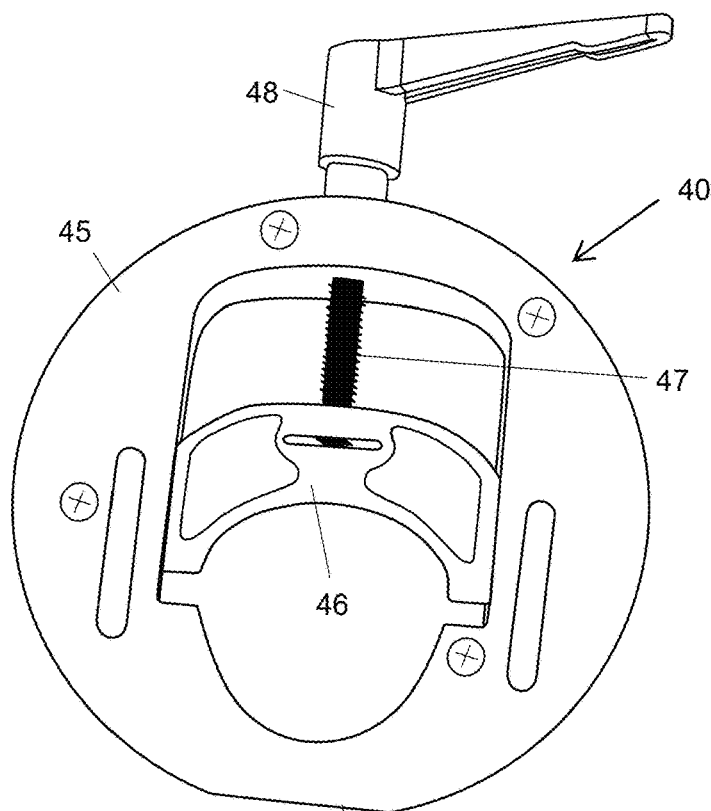
Figure 24B:
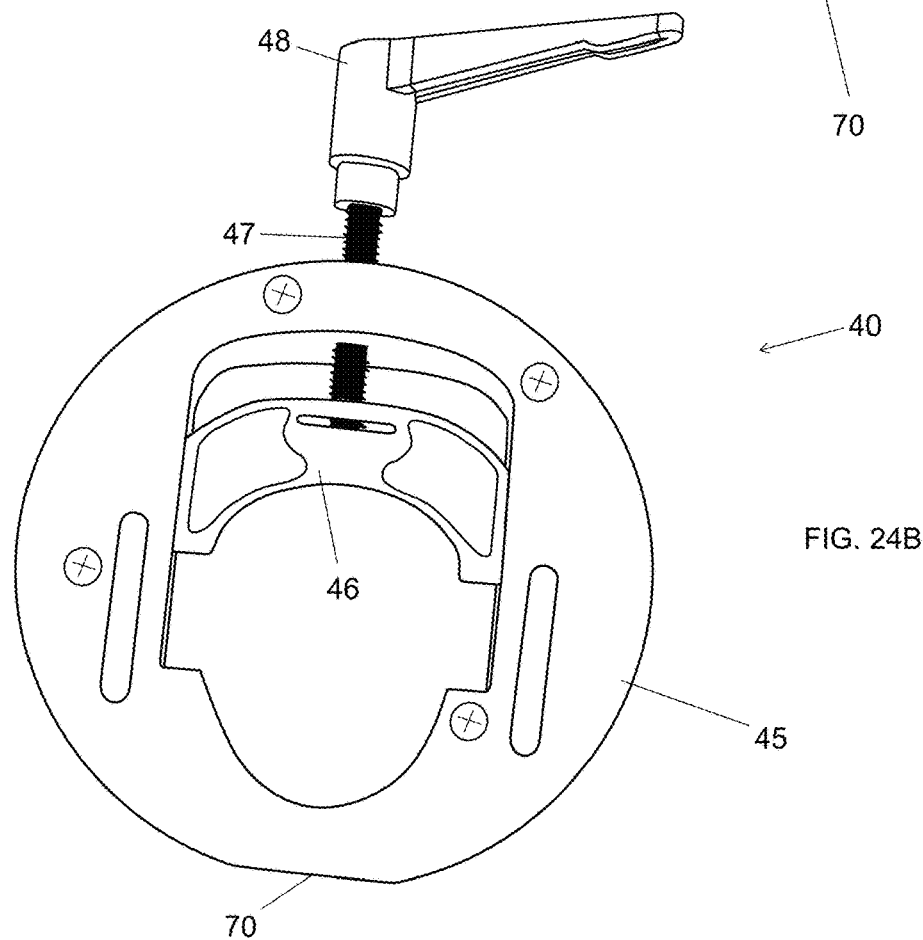
Figure 25:
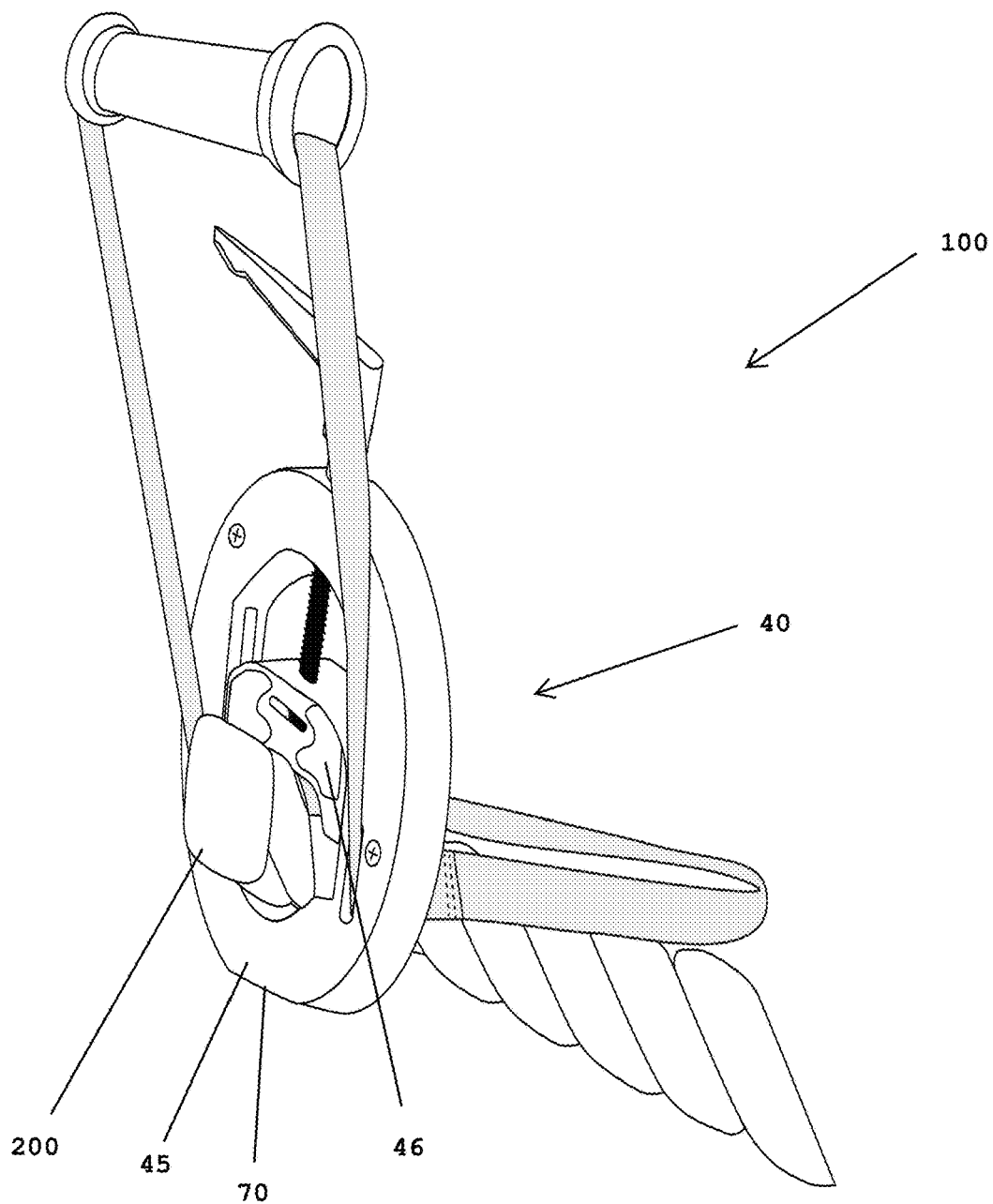
FIGS. 25 and 26 depict views of the seventh embodiment of a rope swinging device attached to a rope.
Figure 26:
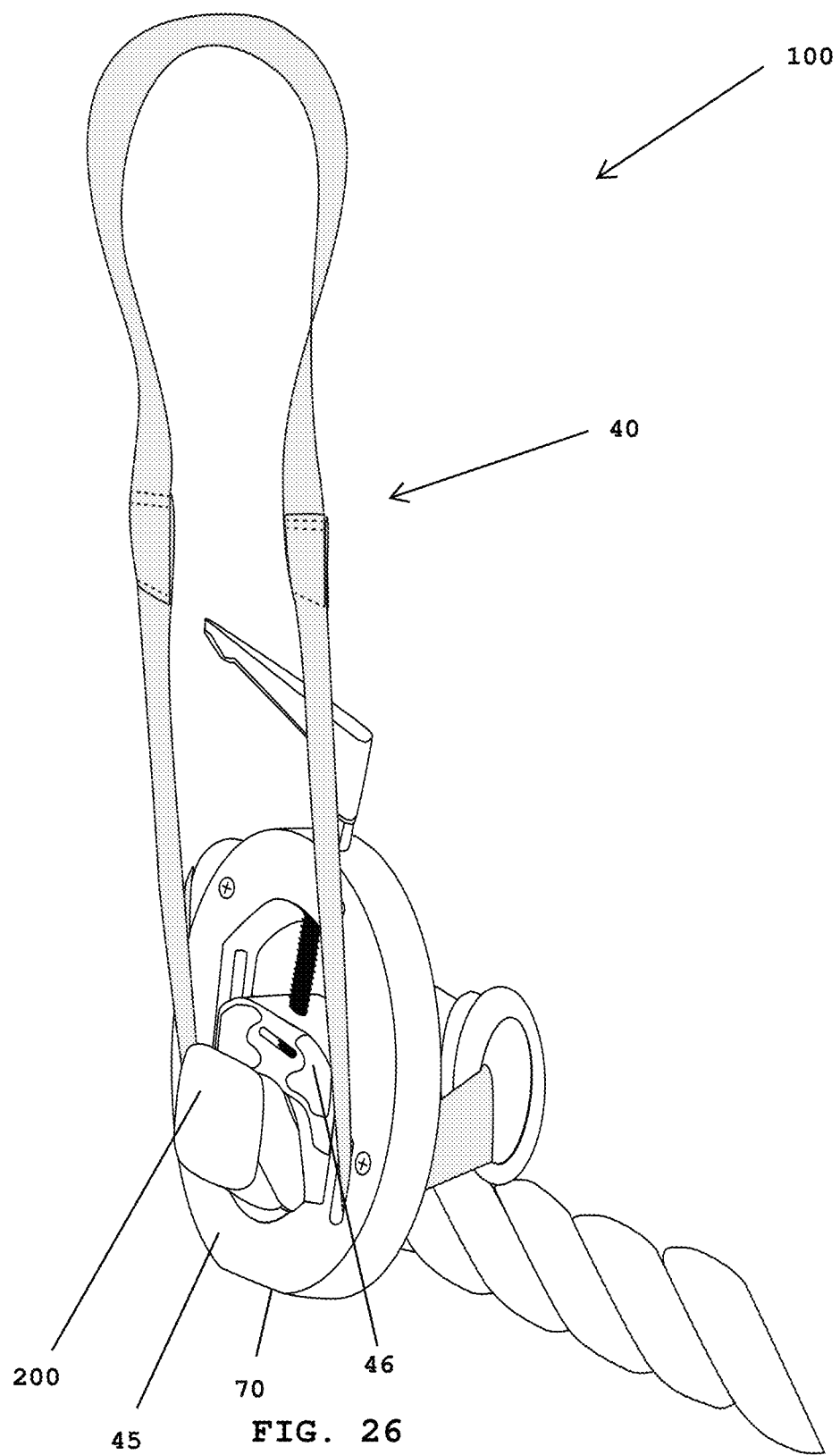
Figure 27:
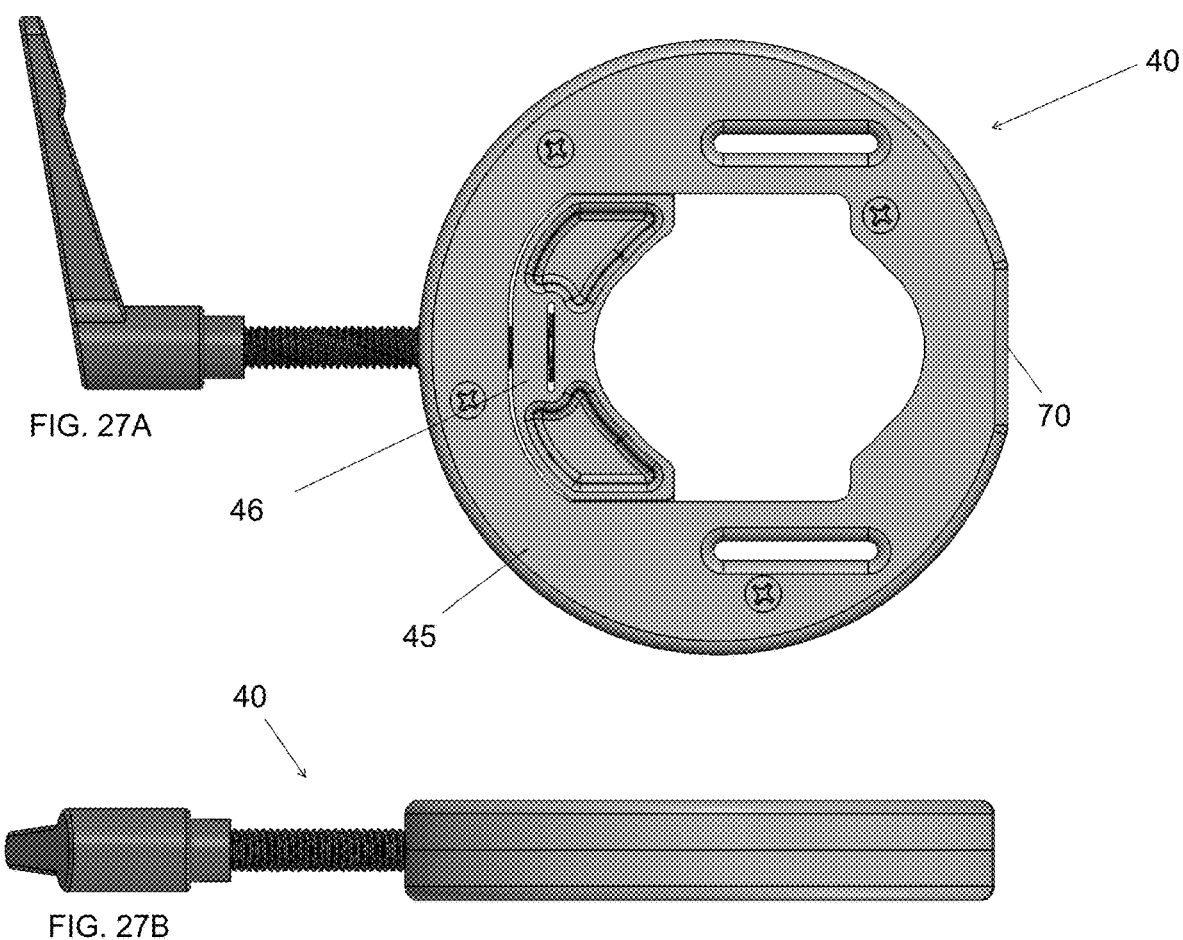
FIGS. 27A and 27B depict views of components of the seventh embodiment of a rope swinging device.
Figure 35:
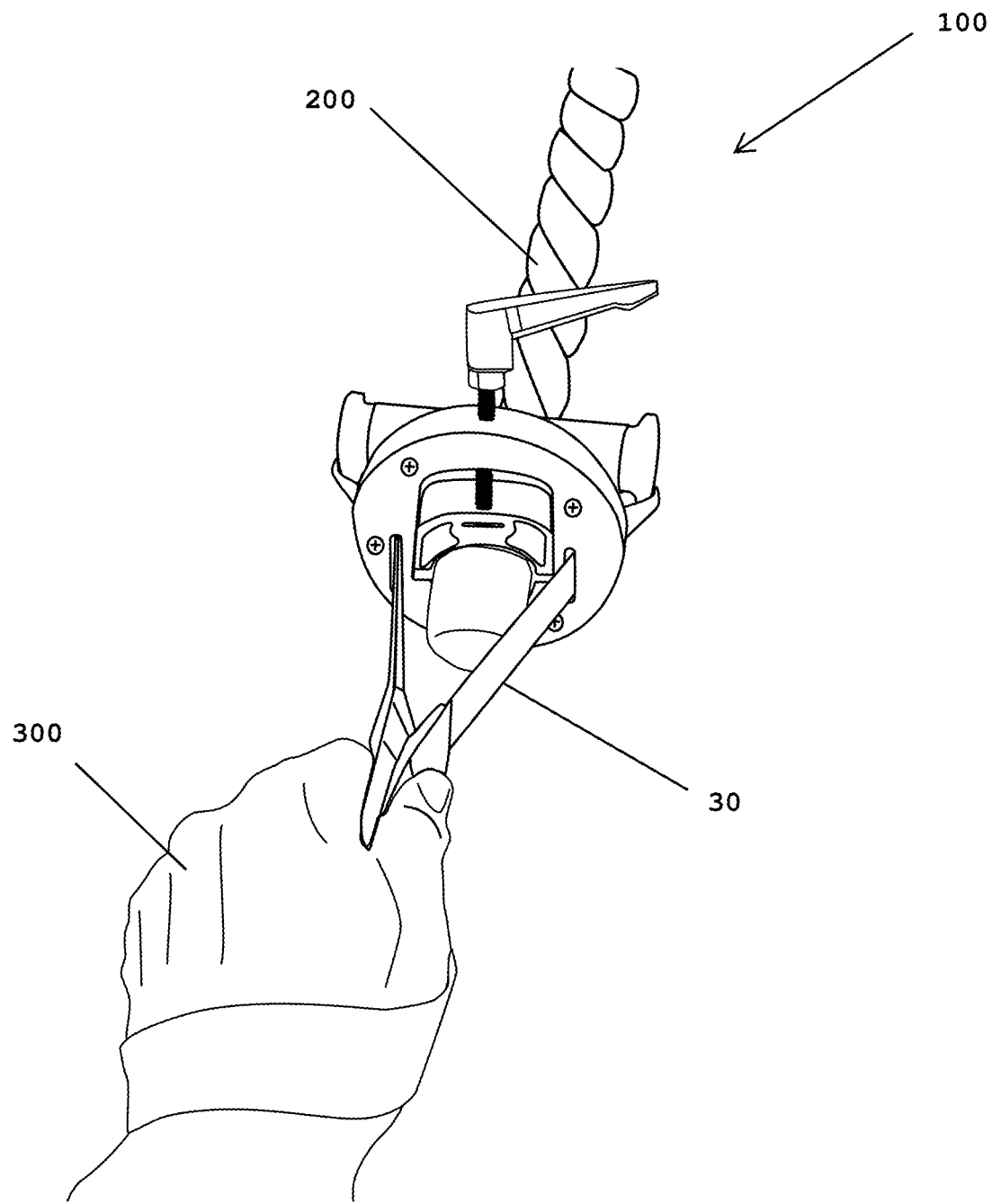

In a seventh embodiment of a rope swinging device 100 that is described and depicted herein (FIGS. 21, 22, 23, 24A, 24B, 25, 26, 27A, and 27B), clamp 40 comprises a substantially circular clamping component 45, a movable clamping component 46, a tightening screw 47, a tightening handle 48 attached to tightening screw 47, and two gaps 41 that are disposed substantially opposite each other on circular clamping component 45, i.e., 180 degrees apart. Substantially circular clamping component 45 comprises a substantially flat side 70, allowing a user to hold a rope swinging device 100 in a stable position on the floor or other surface, in order to easily feed a rope into clamping component 45. This helps to reduce the occurrence of pre-existing torque or twist in the rope, which would have the undesirable effect of exerting a twisting force on rope swinging device 100 while in use. In the depicted embodiment, flat side 70 is disposed substantially opposite (180 degrees) from tightening handle 48. In other embodiments (not shown) flat side 70 may be disposed in other positions relative to tightening handle 48. Tightening screw 47 is screwed through a captive nut 49 (not shown in FIGS. 21, 22, 23, 24A, 24B, 25, 26, 27A, and 27B) with mating threads in circular clamping component 45 and attached to movable clamping component 46 via mating threads in movable clamping component 46. In the depicted embodiment, strap 30 is a continuous loop, and routed through the two gaps 41. Optional thick sections 71 of the strap 30 prevent strap 30 from being pulled completely through gaps 41, thus providing a suitable length to the portion of strap 30 between handgrip 10 and clamp 40 when held by handgrip 10. Thick sections 71 may be created by folding and stitching the strap 30 or other suitable method of increasing the thickness of strap 30. Alternatively, thick sections 71 may be replaced by components that attach to strap 30 to prevent strap 30 from being pulled completely through gaps 41. As depicted in FIG. 35, strap 30 may be wrapped around a user's wrist and hand, permitting an alternate method of gripping rope swinging device 100. As depicted in FIGS. 25 and 26, an end of a rope 200 is inserted between circular clamping component 45 and movable clamping component 46. A tightening handle 48 is used to turn tightening screw 47, thus tightening clamp 40 around the end of the rope. This is shown in FIGS. 24A and 24B, which depict movable clamping component 46 in two different positions relative to circular clamping component 45.

Although depicted in FIGS. 21, 22, 25, and 26, it should be noted that handgrip 10 is optional, as strap 30 may be gripped directly by a user's hand and/or wrapped around a user's hand and/or wrist.

Figure 20:
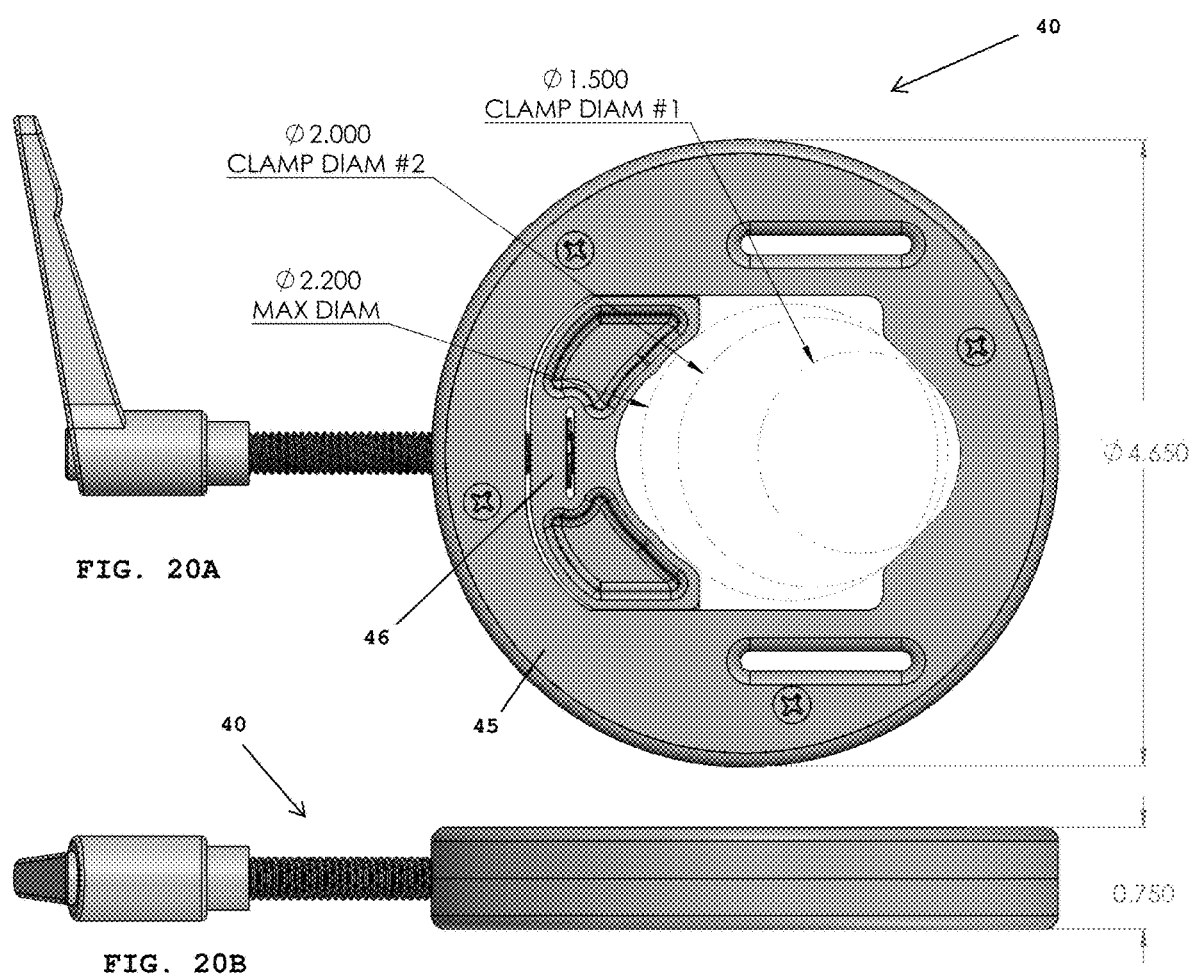
FIGS. 20A and 20B depict views of components of the sixth embodiment of a rope swinging device.
Figure 21:
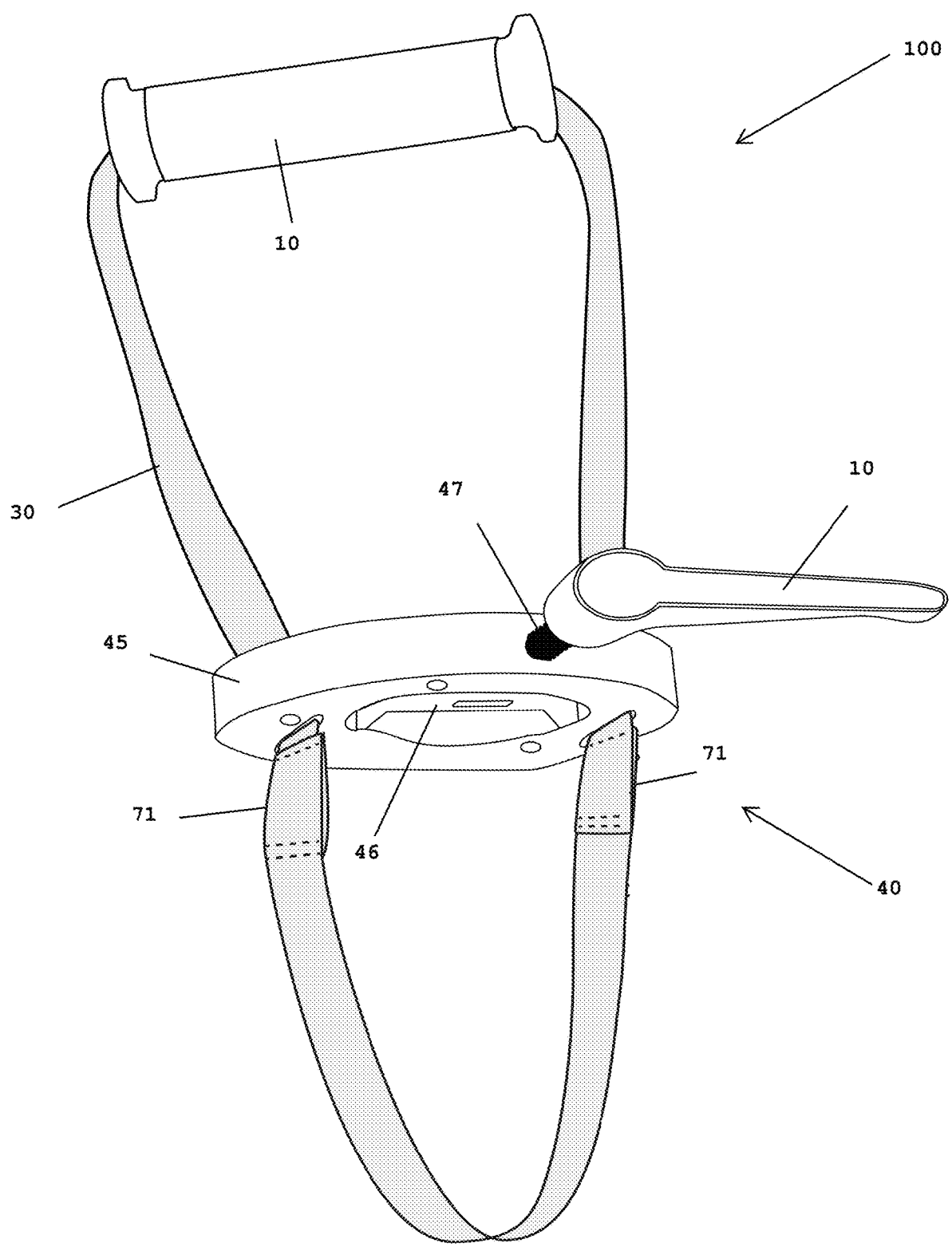
FIGS. 21 and 22 depict views of a seventh embodiment of a rope swinging device.
Figure 22:
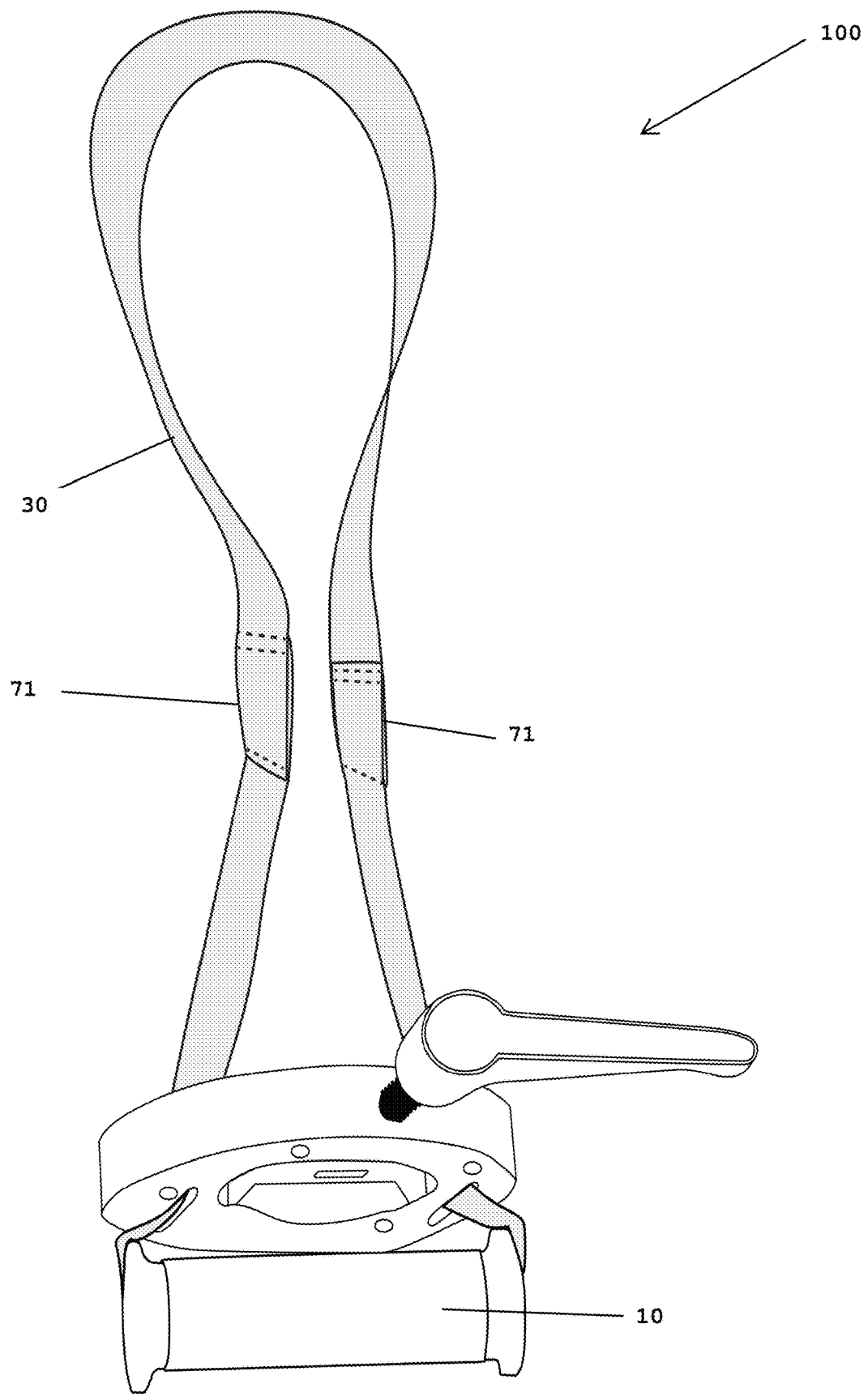
Figure 23:
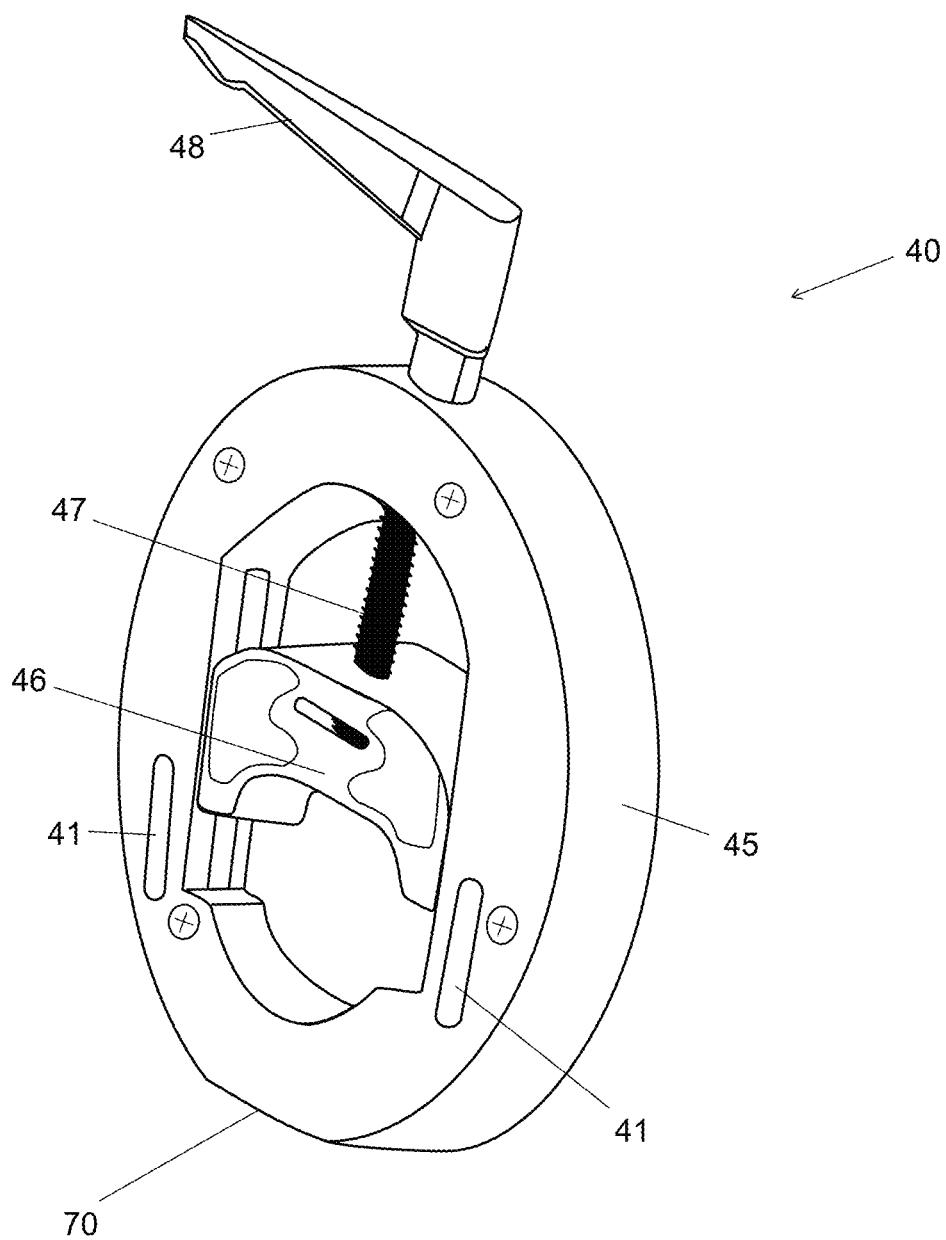
FIGS. 23, 24A, and 24B depict views of components of the seventh embodiment of a rope swinging device.

The diameter and thickness of circular clamping component 45 are approximately 4.65 inches and 0.75 inches, resp. FIG. 20A depicts the varying diameters of space for tightening around a rope that may be created between circular clamping component 45 and movable clamping component 46. In the depicted embodiment, the diameter can vary from 1.5 inches to 2.2 inches.

The handgrip 10 comprises a hollow space 11 and is substantially cylindrical, with a length 12 greater than a diameter 13, and first strap 30 is attached to handgrip 10 by being routed through the hollow space 11 of handgrip 10. The first strap 30 is relatively free to move within and along the surface of hollow space 11 of handgrip 10. Thus, the handgrip 10 may rotate with respect to first strap 30 when used by a person, thereby reducing the presence of undesirable forces on the wrists and providing a more secure grip.

In other embodiments (not shown), the handgrip 10 does not comprise a hollow space 11 and/or is not substantially cylindrical, and first strap 30 is attached to handgrip 10 by other components, configurations, and/or means. In yet other embodiments (not shown), ends 31 of first strap 30 do not comprise end loops 32 and/or clamp 40 does not comprise two gaps 41, and first strap 30 is attached to clamp 40 by other components, configurations, and/or means.

The handgrip 10 may be made of plastic, e.g., acrylonitrile butadiene styrene (ABS). An optional grip cushion (not shown) may be made of neoprene, TPR rubber, or other cushioning material. The first strap 30, which may be substantially flat, and substantially comprised of a flexible material, may comprise a strip of nylon sports webbing, polypropylene webbing, or other durable material or fabric with strength sufficient to support a rope. The weight range, material composition, and diameter of a rope to which a rope swinging device 100 is attached may vary, depending upon the application and upon the needs of the athlete. For example, a rope may be as little as 20 pounds, as much as 80 pounds, or even more, and may be between 1.5 to 2 inches in diameter. A rope to which a rope swinging device 100 is attached may be comprised of nylon, cotton, polyester, rubber, and/or polypropylene, including combinations thereof. Depending upon the weight requirements, a rope swinging device 100 may be constructed of materials of suitable types and strengths.

The following dimensions are used in the embodiment of a rope swinging device 100 that is described and depicted herein. However, other dimensions may be used. The length of a first strap 30, which in this embodiment is substantially flat, is approximately 35 inches. The width of a first strap 30 is approximately 1 inch and the thickness of a first strap 30 is approximately 0.038 inches.

The length and width of a second strap 50, which in the embodiments described and depicted herein is substantially flat, are approximately 9.5 inches and 2 inches, respectively. The lengths of hoop and loop fastener 33, 35 are approximately 2.5 inches.

The length, diameter and thickness of a handgrip 10, through which first strap 30 is routed before its ends are attached to clamp 40, are approximately 5.5 inches, 1.25 inches and 0.076 inches, resp. The length, diameter and thickness of an optional grip cushion are approximately 5 inches, 1.25 inches and 0.038 inches, resp.

All exercises listed herein can be done in combination with one another. They can also be done in a seated position, standing position, or prone position (face up or down), using one arm, two arms, alternating arms, or any combination of these variations.

A handgrip 10 of a rope swinging device 100 can be gripped with an overhead, underhand, or vertical (hammer) grip by a user (FIGS. 28-34), or a combination of these grips, to perform the exercises listed herein.

In addition, a user can wrap the first strap 30 around their wrist (FIG. 35). This might be useful for a user with an impingement problem such as carpal tunnel syndrome, or a user who prefers a faster exercise pace made possible by directing gripping the strap first 30 instead of the handgrip 10. The swinging motion/movement provided by the user keeps the handgrip 10 down and out of the way when using a rope swinging device 100 in this manner. Similarly, a user who prefers a faster pace might grip the handgrip 10 together with the first strap 30.

Figure 28:
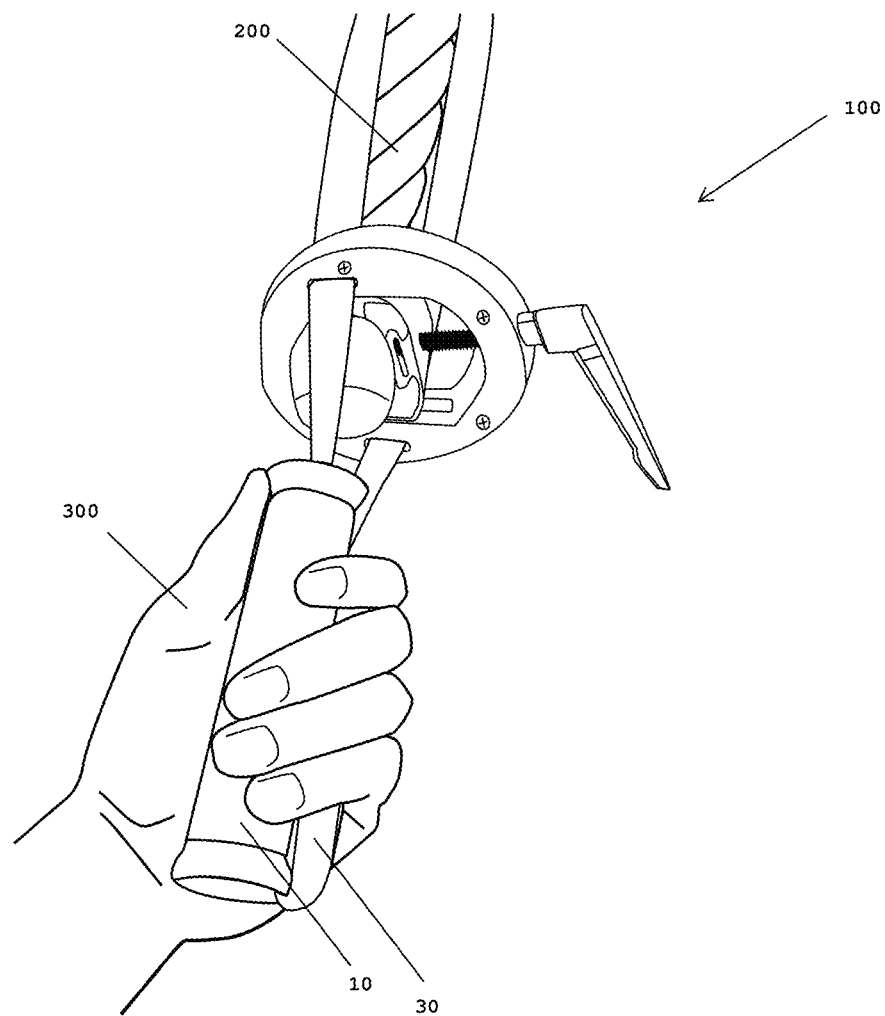
FIGS. 28-35 depict views of a person's hand holding a rope swinging device.
Figure 29:
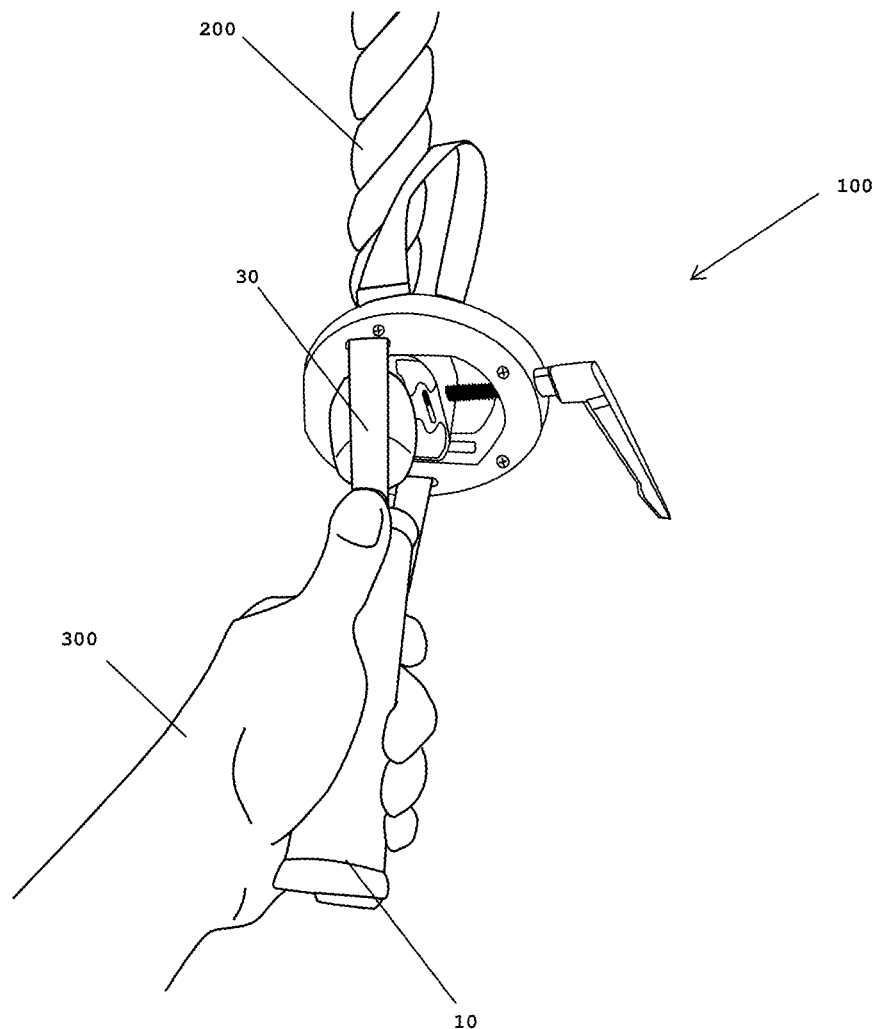
Figure 36:
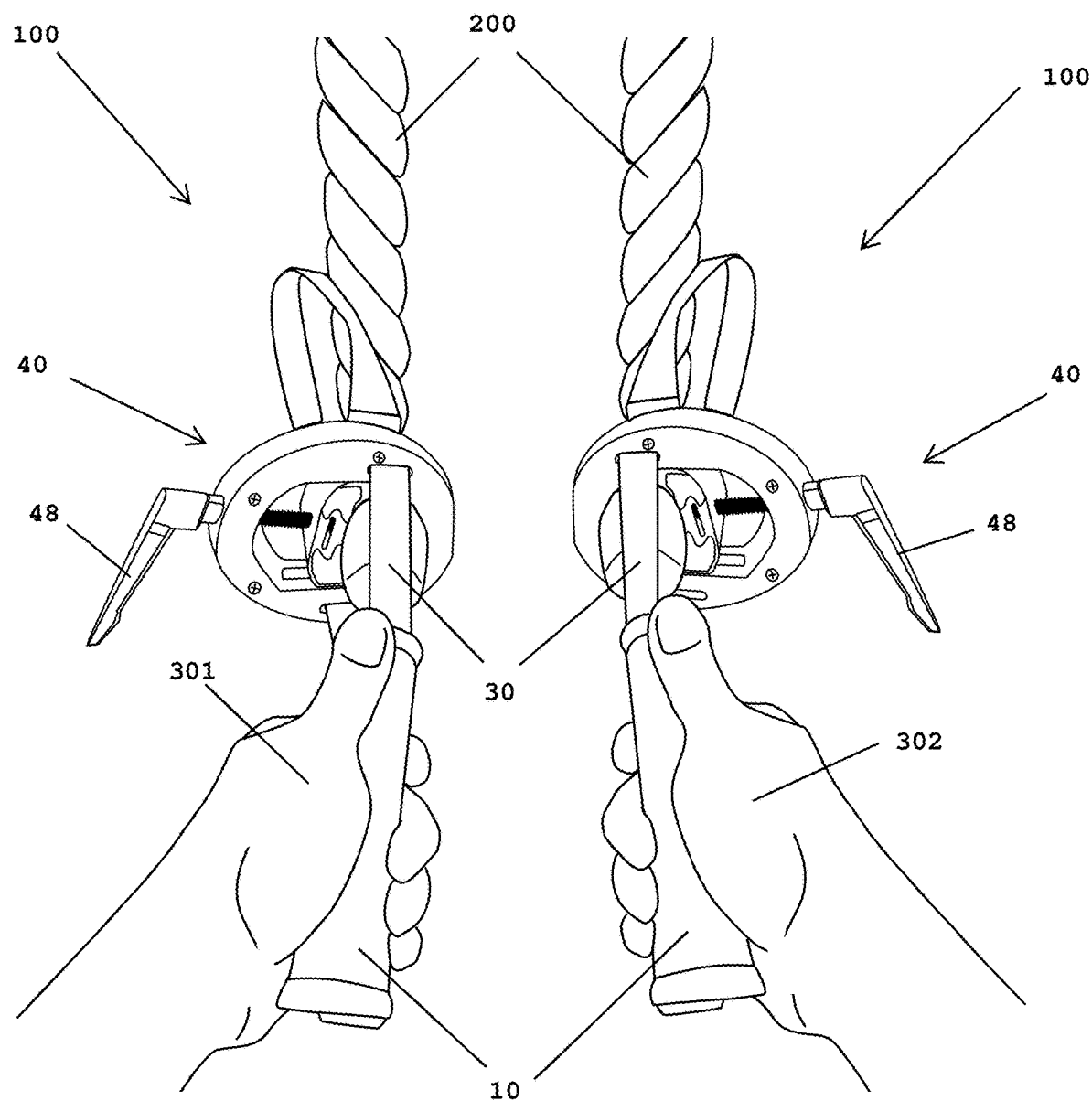
FIGS. 36-37 depict views of a person's hands holding two rope swinging devices.

FIGS. 28 and 29 each depict a view of a person's hand 300 holding a rope swinging device 100 attached to a rope 200, where the hand 300 grips both the handgrip 10 and the first strap 30 (a "hammer" grip). Such a grip provides variety, is advantageous to perform some exercises, and provides security and comfort for all users and those with smaller hands. This grip requires the user to attach a rope swinging device 100 to a rope 200 with clamp 40 turned 90 or 270 degrees (as depicted in FIG. 36).

Figure 30:
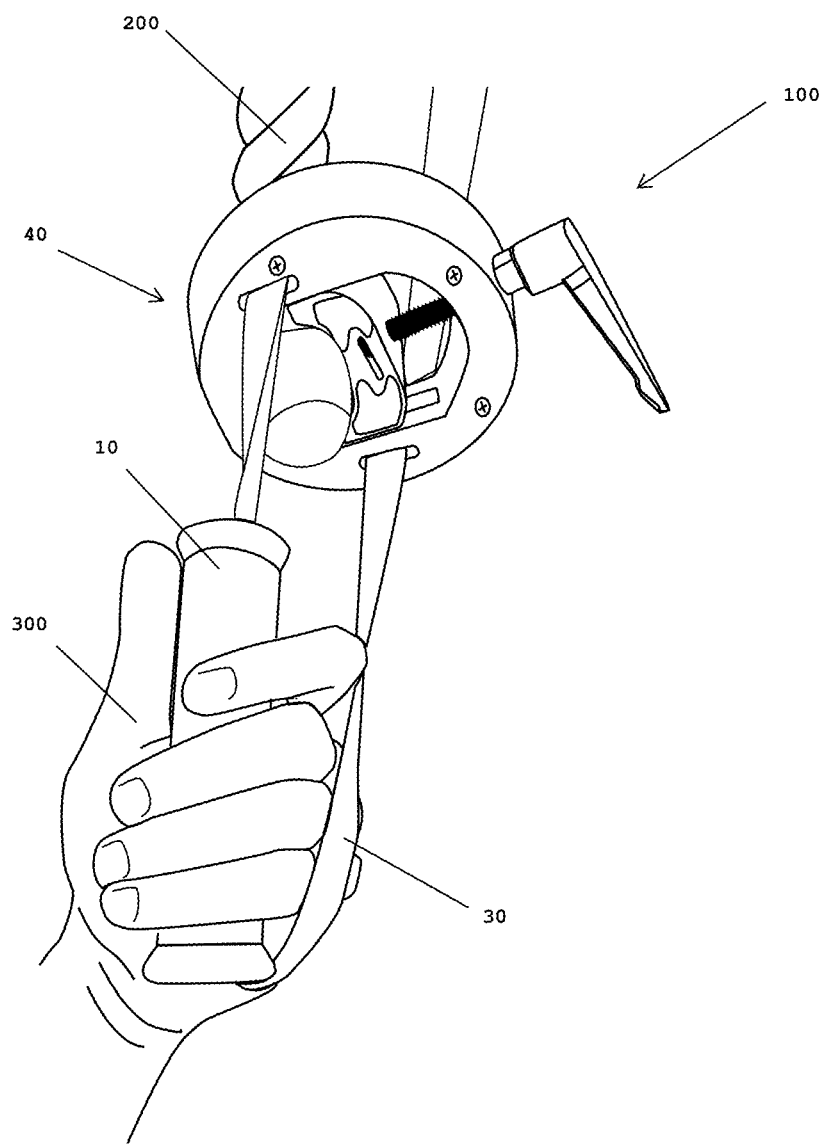

FIG. 30 depicts a view of a person's hand 300 holding a rope swinging device 100 attached to a rope 200, where the hand 300 grips both the handgrip 10 and the first strap 30. Such a grip provides variety and is advantageous to perform some exercises that cannot be performed with an overhand grip. This grip requires the user to attach a rope swinging device 100 a rope 200 with clamp 40 turned 90 or 270 degrees as depicted in FIG. 36, thus aligning the handgrip 10 with rope 200 allowing a user to hold handgrip 10 in a similar manner as they would hold rope 200 if not using a rope swinging device 100. With this grip, the strap 30 presses against the hand 300, thus providing a more secure hold.

Figure 31:
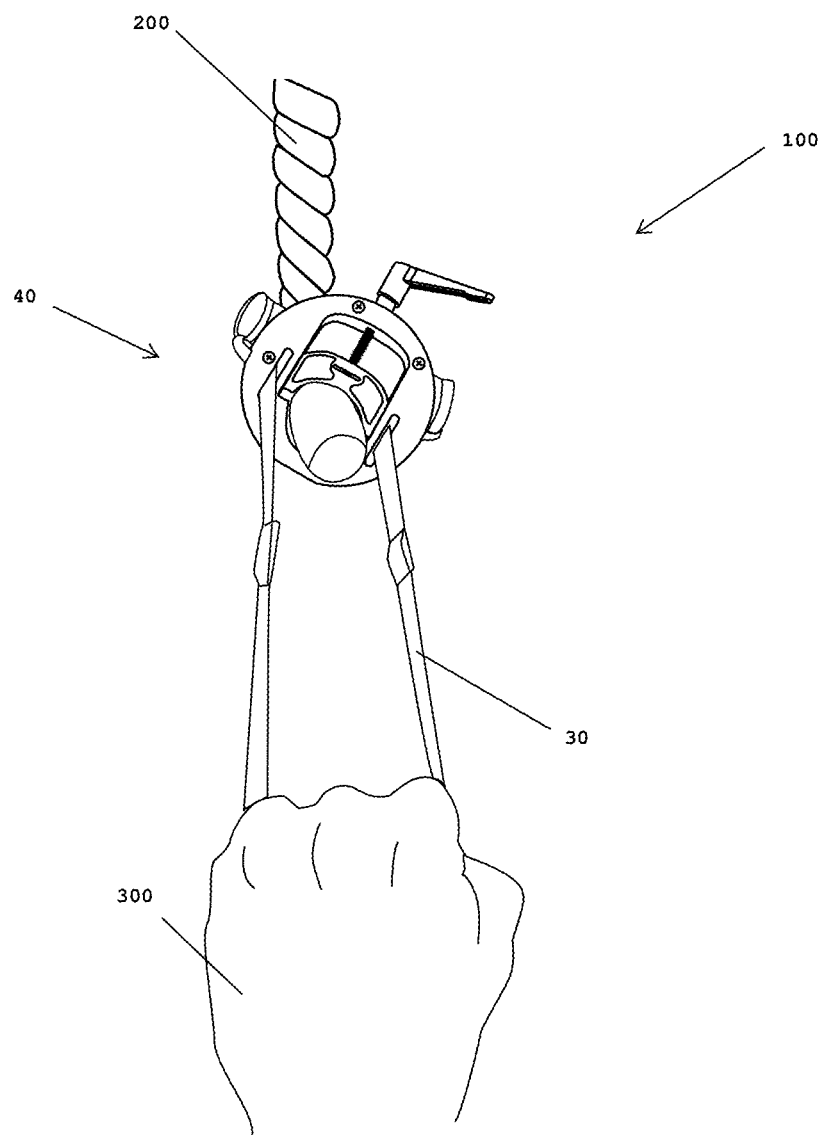
Figure 32:
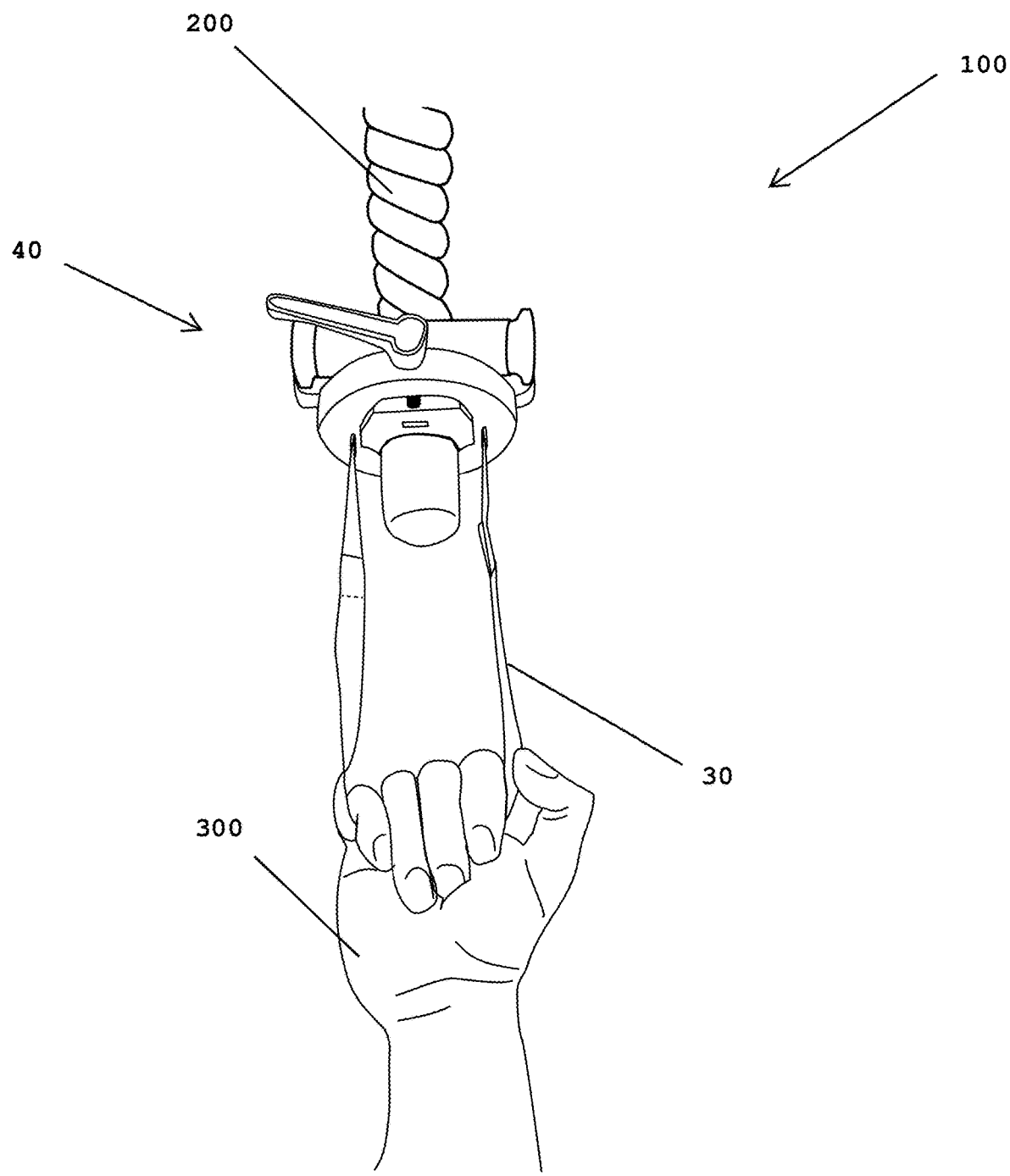

FIGS. 31 and 32 each depict a view of a person's hand 300 holding a rope swinging device 100 attached to a rope 200, where the hand 300 grips the strap 30 with either an overhand and underhand grip, resp. Such a grip provides comfort for all users and those with smaller hands, and can permit a user to perform exercises more rapidly. e.g., a so-called "Alternating Uppercut" exercise. Due to a longer distance between the hand 300 and clamp 40, there is a delayed "wave effect", thereby making exercise more difficult and providing increased strength training.

Figure 33:
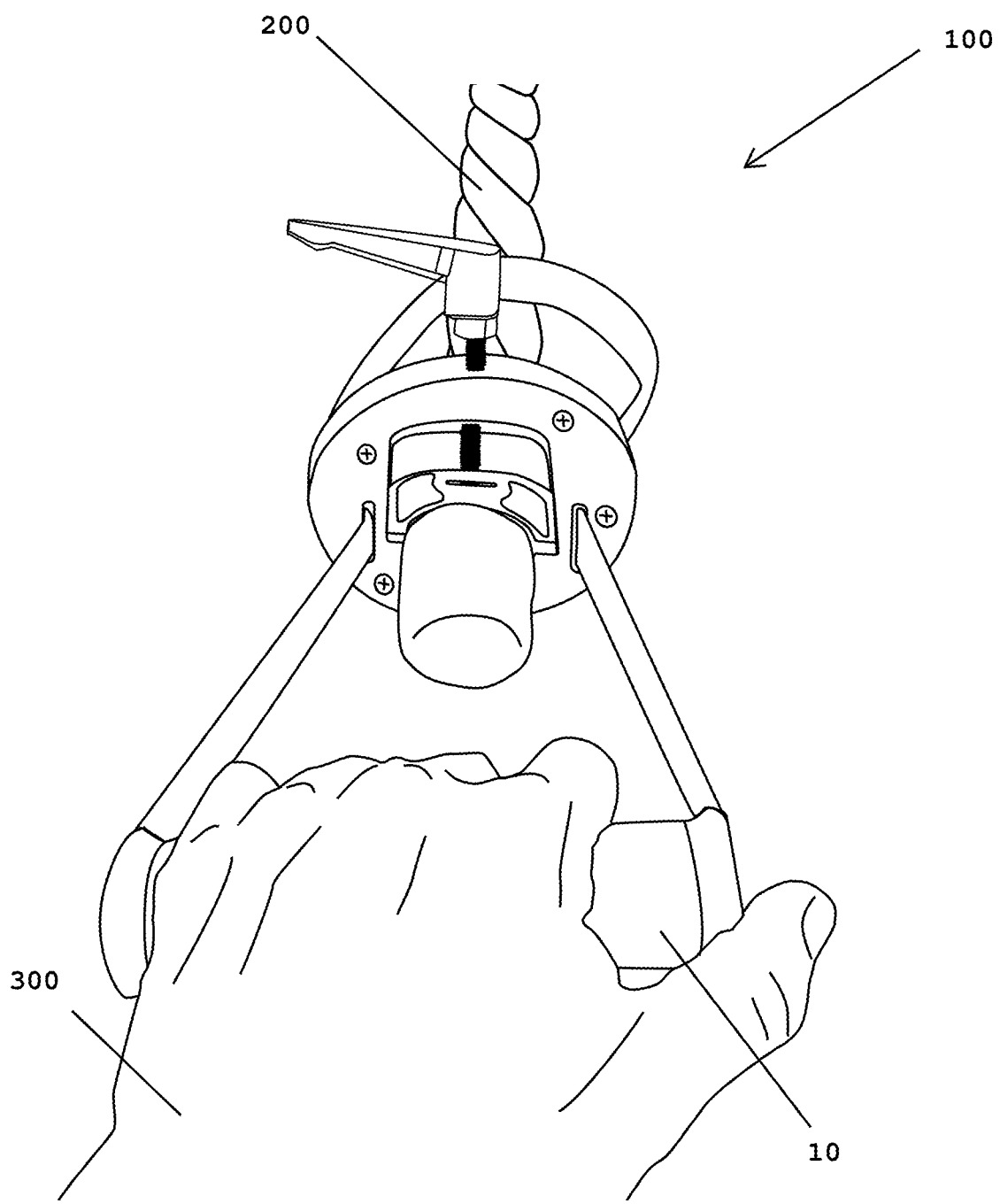
Figure 34:
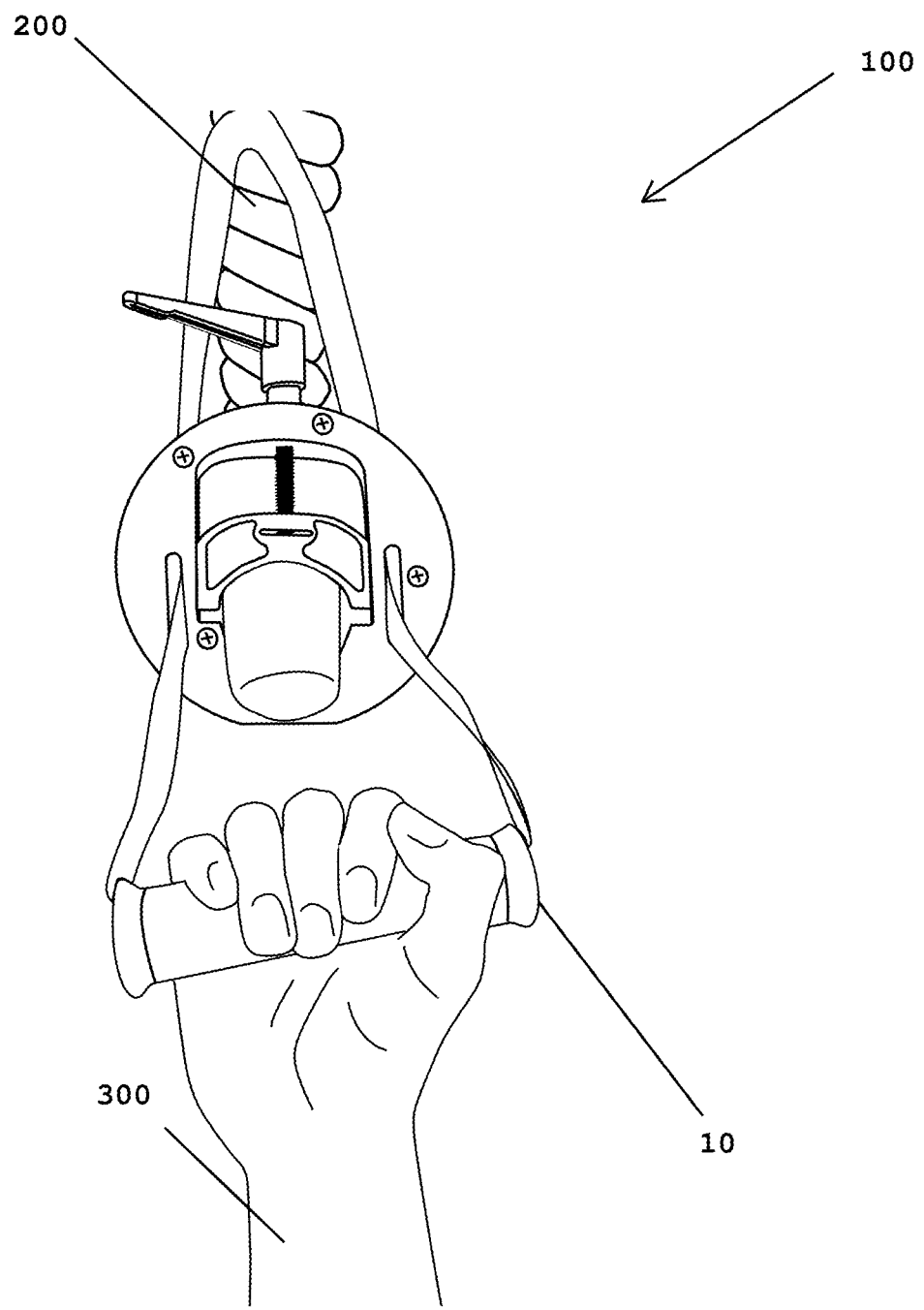

FIGS. 33 and 34 each depict a view of a person's hand 300 holding a rope swinging device 100 attached to a rope 200, where the hand 300 grips the handgrip 10 with either an overhand and underhand grip, resp.

FIG. 35 depicts a view of a person's hand 300 holding a rope swinging device 100 attached to a rope 200, where the strap 30 is wrapped around the person's wrist and hand 300.

FIG. 36 depicts a view of a person's hands 301, 302 holding two rope swinging devices 100 in a so-called hammer grip, where each rope swinging device 100 is attached to a rope 200 with respective clamps 40 at angles of approximately 90 and 270 degrees (9 o'clock and 3 o'clock) relative to a horizontal surface (not shown), resp. In other words, clamp 40 of the rope swinging device 100 that is held by a person's left hand 301 and clamp 40 of the rope swinging device 100 that is held by a person's right hand 302 are at an angle of approximately 180 degrees with respect to each other. This arrangement allows each handgrip 10 and strap 30 to be suitably angled for a hammer grip, and also reduces the likelihood of the tightening handles 48 making contact during the performance of rope swinging exercises. Gripping the two rope swinging devices 100 in this manner may be preferred by users with small hands.

Figure 37:
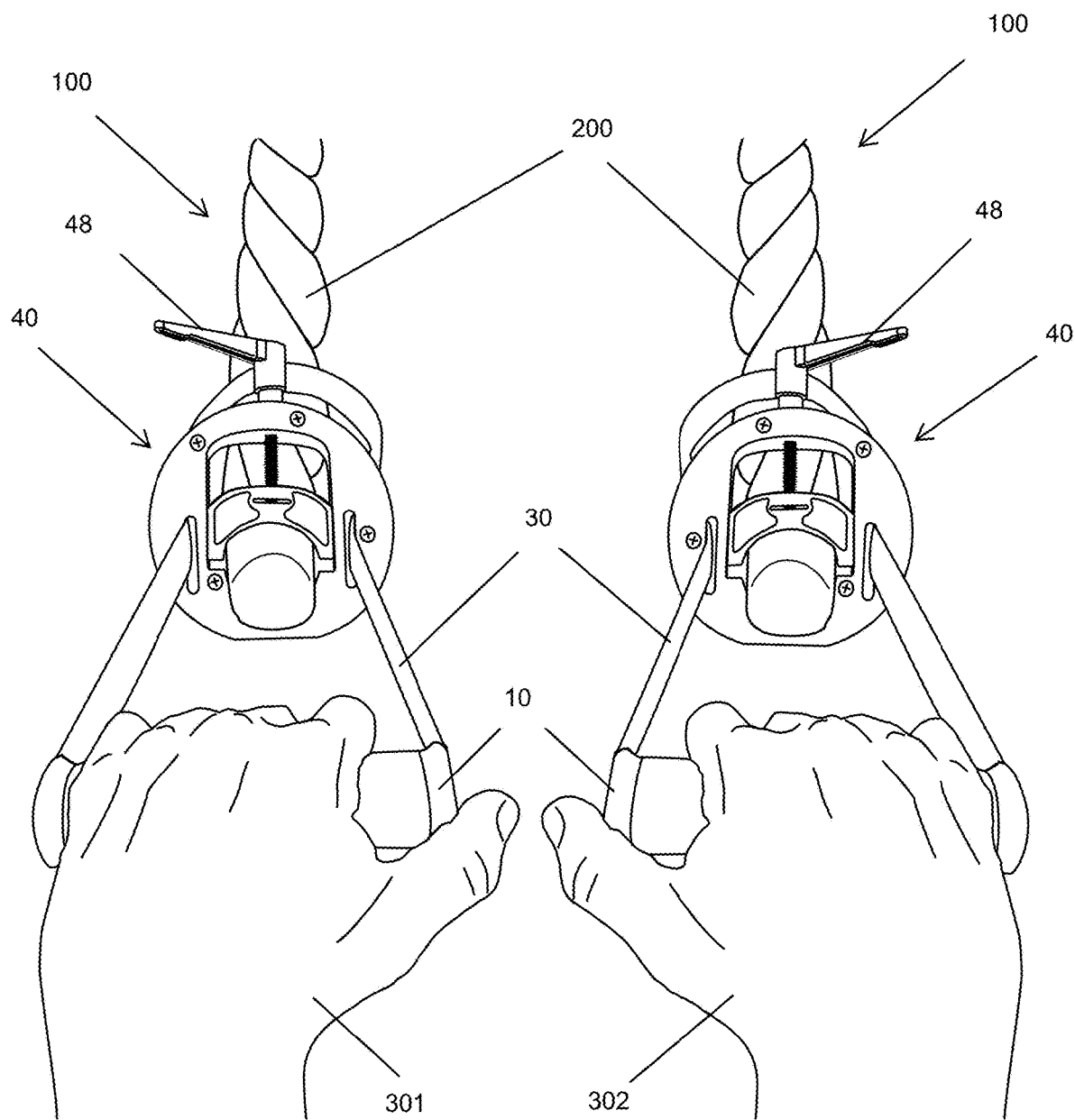

FIG. 37 depicts a view of a person's hands 301, 302 holding two rope swinging devices 100 in a so-called overhand grip, where each rope swinging device 100 is attached to a rope 200 with respective clamps 40 at angles of approximately 0 and (12 o'clock) relative to a horizontal surface (not shown). In other words, clamp 40 of the rope swinging device 100 that is held by a person's left hand 301 and clamp 40 of the rope swinging device 100 that is held by a person's right hand 302 are at an angle of approximately 0 degrees with respect to each other. This arrangement allows each handgrip 10 and strap 30 to be suitably angled for an overhand (or underhand) grip.

Figure 38:
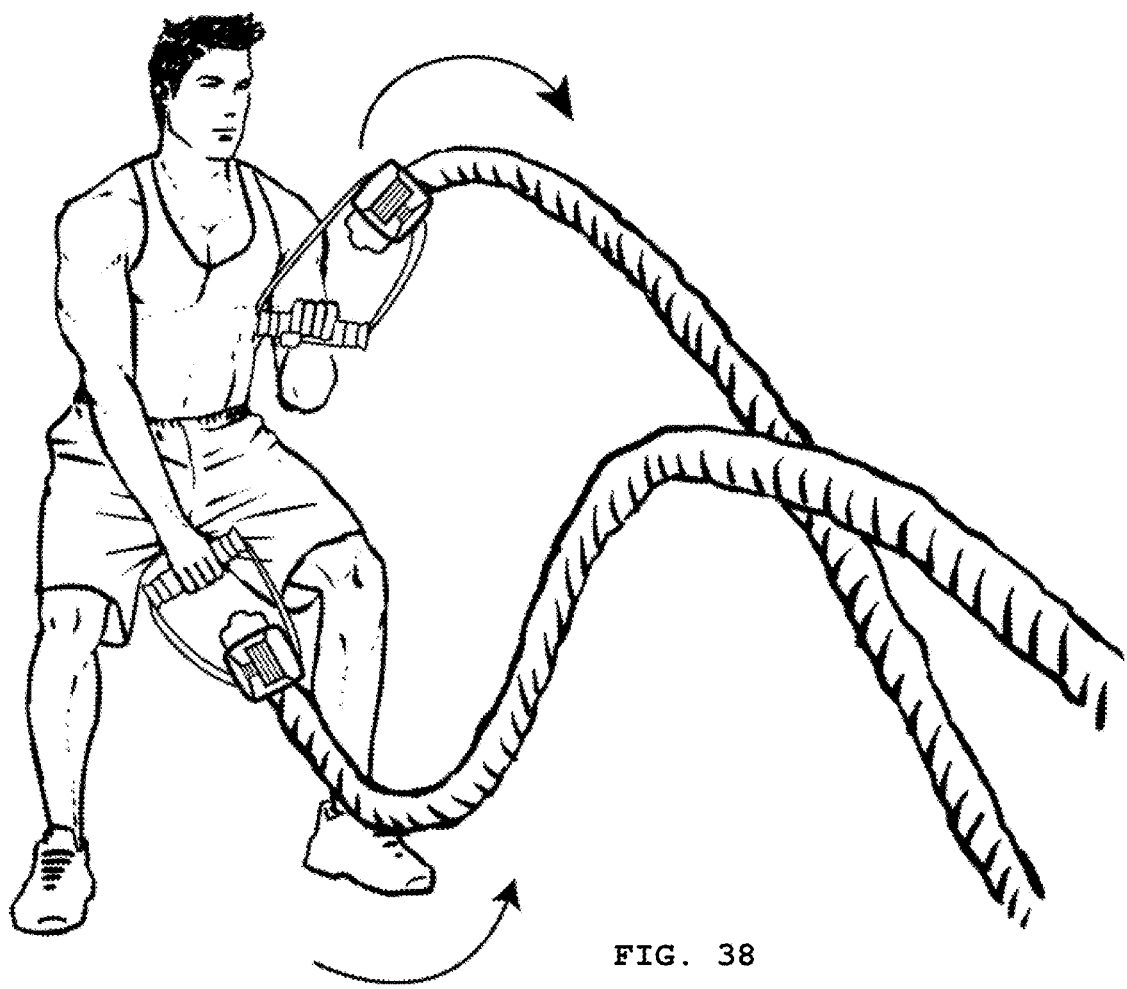
FIGS. 38-40 depict views of persons using two rope swinging devices to perform exercises.
Figure 39:
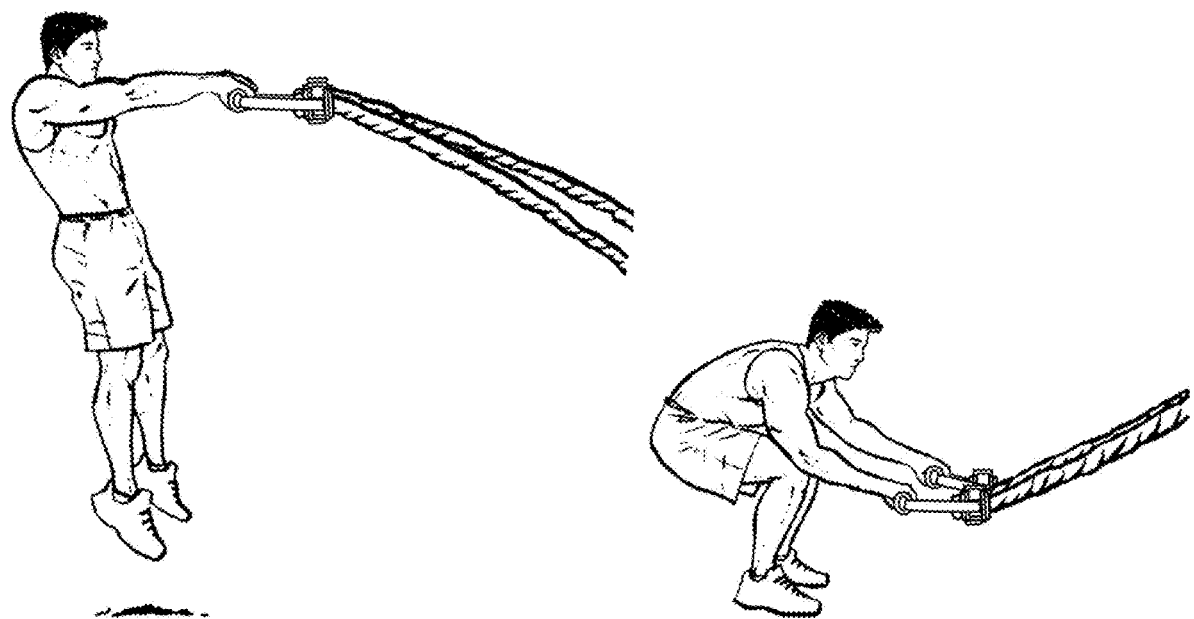
Figure 40:
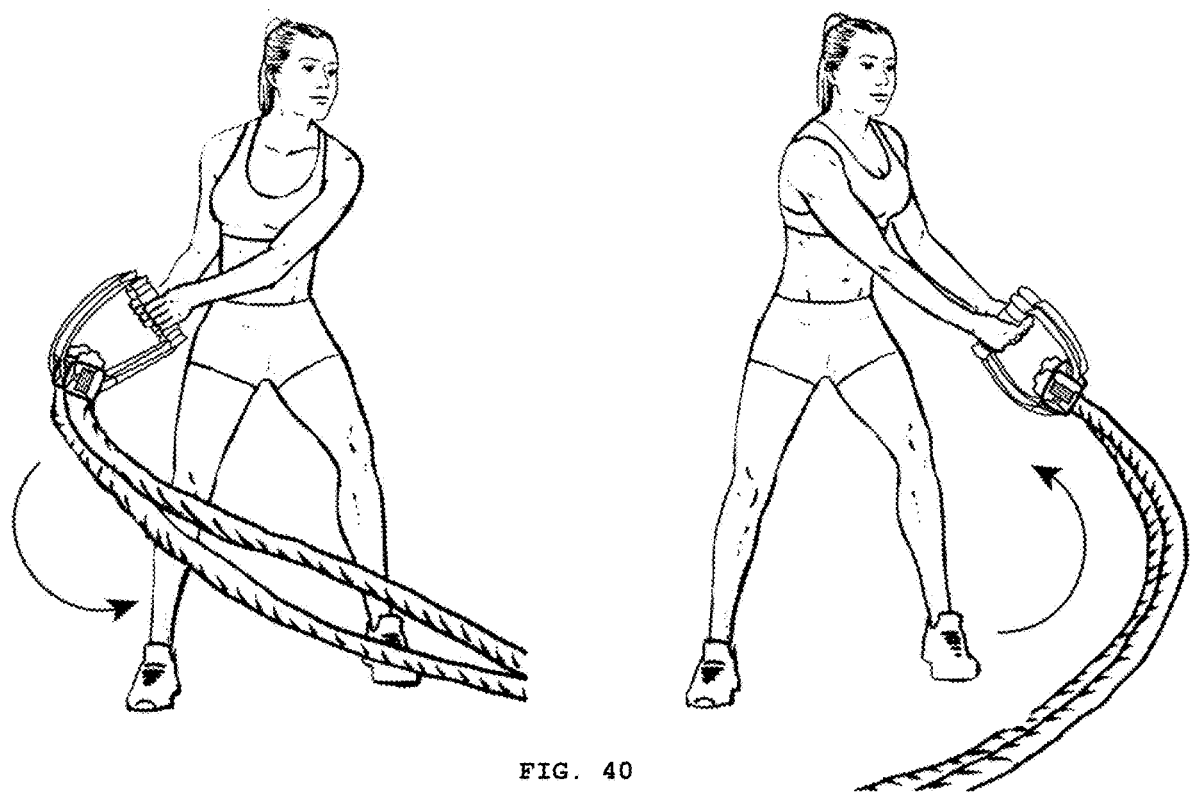

FIGS. 38-40 depict persons using two rope swinging devices 100, as depicted and described herein, to perform the following exercises, respectively: Alternating Waves, Rope Slams, and Sidewinders. The muscle group focus for each of the three exercises is as follows: Alternating Waves—biceps, triceps, shoulders, back, and abdominals/core; Rope Slams—quadriceps, hamstrings, glutes, biceps, triceps, shoulders, back, and abdominals/core; and Sidewinders—quadriceps, hamstrings, glutes, biceps, triceps, shoulders, back, and abdominals/core.

Each of the depicted and described methods of use of two rope swinging devices 100 may be performed in a similar manner with a single rope swinging device 100. The reasons for doing so include the desire or need to exercise only a single arm, to maintain a desired position with a free arm while exercising the other arm, to exercise different aspects of the user's core musculature, and simply to achieve variety on ones' exercise routine.

The rope swinging device 100, as described herein, meets the existing need for a device that provides a more comfortable and secure grip and reduces the presence of undesirable forces on the wrists. The rope swinging device 100 described herein also better facilitates proper biomechanics by providing an axis of rotation that allows for proper flexion and extension at the wrist, in part because its handgrip 10 may rotate with respect to first strap 30 when used by a person.

In addition, the rope swinging device 100, as described herein, provides the user with an ability to attach it to ropes of different diameters, due to its inclusion of a clamp 40.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B," "one or more of A and B," and "A and/or B" are each intended to mean "A alone, B alone, or A and B together." A similar interpretation is also intended for lists including three or more items. For example, the phrases "at least one of A, B, and C," "one or more of A, B, and C," and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A rope swinging device, said device comprising:
  a strap comprising a flexible material, wherein said strap is a continuous loop,
  a clamp for attaching to a rope, said clamp attached to said strap, wherein said clamp comprises a substantially circular clamping component and a movable clamping component, said movable clamping component translates within said substantially circular clamping component, where a space between said substantially circular clamping component and said movable clamping component may vary, and
  a tightening handle, wherein said tightening handle may be operated to decrease said space to attach said clamp to a rope.

2. The rope swinging device of claim 1, further comprising a handgrip attached to said strap.

3. The rope swinging device of claim 2, wherein said handgrip is substantially cylindrical and hollow and said strap is routed through said handgrip.

4. The rope swinging device of claim 1, wherein said strap is substantially flat.

5. The rope swinging device of claim 1, wherein said clamp comprises two gaps, and said strap is routed through said two gaps.

6. The rope swinging device of claim 5, wherein said two gaps are disposed substantially opposite each other on said clamp.

7. The rope swinging device of claim 5, said strap further comprising two components for preventing the strap from being pulled completely through said gaps.

8. The rope swinging device of claim 1, wherein said substantially circular clamping component comprises a substantially flat side.

9. The rope swinging device of claim 8, wherein said substantially flat side is disposed substantially opposite said tightening handle.

10. The rope swinging device of claim 1, wherein said substantially circular clamping component and said movable clamping component each engage said rope to tighten said clamp around said rope.

11. A rope swinging device, said device comprising:
a strap comprising a flexible material, wherein said strap is a continuous loop,
a clamp for attaching to a rope, said clamp attached to said strap, wherein said clamp comprises a substantially circular clamping component and a movable clamping component, where a space between said substantially circular clamping component and said movable clamping component may vary,
a tightening handle, wherein said tightening handle may be operated to decrease said space to attach said clamp to a rope, and
a handgrip attached to said strap, said handgrip not attached to said clamp.

12. The rope swinging device of claim 11, further comprising a substantially flat side disposed substantially opposite said tightening handle.

13. The rope swinging device of claim 11, wherein said handgrip is substantially cylindrical and hollow and said strap is routed through said handgrip.

14. The rope swinging device of claim 11, wherein said strap is substantially flat.

15. The rope swinging device of claim 11, wherein said clamp comprises two gaps, and said strap is routed through said two gaps.

16. The rope swinging device of claim 15, wherein said two gaps are disposed substantially opposite each other on said clamp.

17. The rope swinging device of claim 15, said strap further comprising two components for preventing the strap from being pulled completely through said gaps.

18. The rope swinging device of claim 11, wherein said substantially circular clamping component and said movable clamping component each engage said rope to tighten said clamp around said rope.

19. A rope swinging device, said device comprising:
a strap comprising a flexible material, wherein said strap is a continuous loop,
a clamp for attaching to a rope, said clamp attached to said strap, wherein said clamp comprises a substantially circular clamping component and a movable clamping component, where a space between said substantially circular clamping component and said movable clamping component may vary, and
a tightening handle, wherein said tightening handle may be operated to decrease said space to attach said clamp to a rope,
wherein said clamp comprises two gaps disposed substantially opposite each other on said clamp, said strap routed through said two gaps and further comprising two components for preventing said strap from being pulled completely through said gaps.

20. The rope swinging device of claim 19, further comprising a handgrip attached to said strap.

* * * * *